United States Patent
Mills

(10) Patent No.: US 11,775,285 B2
(45) Date of Patent: *Oct. 3, 2023

(54) SYSTEM AND METHOD FOR MANAGING A PUBLIC SOFTWARE COMPONENT ECOSYSTEM USING A DISTRIBUTED LEDGER

(71) Applicant: Oracle International Corporation, Redwood Shores, CA (US)

(72) Inventor: Duncan Mills, Winchester (GB)

(73) Assignee: Oracle International Corporation, Redwood Shores, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 17/024,028

(22) Filed: Sep. 17, 2020

(65) Prior Publication Data
US 2021/0004224 A1    Jan. 7, 2021

Related U.S. Application Data

(63) Continuation of application No. 15/829,684, filed on Dec. 1, 2017, now Pat. No. 10,810,004.

(Continued)

(51) Int. Cl.
*G06F 8/70* (2018.01)
*G06F 8/71* (2018.01)
(Continued)

(52) U.S. Cl.
CPC .............. *G06F 8/70* (2013.01); *G06F 8/30* (2013.01); *G06F 8/36* (2013.01); *G06F 8/71* (2013.01);
(Continued)

(58) Field of Classification Search
CPC .............. G06F 8/70; G06F 8/20; G06F 8/30
See application file for complete search history.

(56) References Cited

U.S. PATENT DOCUMENTS 10,810,004 B2 * 10/2020 Mills ...................... G06F 8/70
2018/0131581 A1 * 5/2018 DeLuca ............. H04L 41/5019
(Continued)

FOREIGN PATENT DOCUMENTS

JP    2002-314540 A    10/2002
JP    2014-514670 A     6/2014
(Continued)

OTHER PUBLICATIONS

Nikos Fotiou,, et al., "Decentralized name-based security for content distribution using blockchains," 2016 IEEE Conference on Computer Communications Workshops, IEEE, (Apr. 10, 2016) retrieved from https://ieeexplore.ieee.org/document/7562112 on Oct. 1, 2019 (Year: 2016).*

(Continued)

*Primary Examiner* — Lewis A Bullock, Jr.
*Assistant Examiner* — Theodore E Hebert
(74) *Attorney, Agent, or Firm* — Trellis IP Law Group, PC

(57) ABSTRACT

Embodiments include systems and methods that facilitate implementation of software component ecosystems using a distributed ledger, e.g., as implemented in part as a distributed blockchain, that is maintained by ecosystem full nodes, called catalog instances. Various registration transactions, e.g., developer registrations, namespace registrations, usage registrations, and so on, may be added to the distributed blockchain by one or more catalog instances. Adding blocks to the blockchain may including using a tree hash of tending transactions to generate a block hash for the new block. The new block also includes or incorporates a hash of an immediately prior block.

17 Claims, 19 Drawing Sheets

Related U.S. Application Data

(60) Provisional application No. 62/553,406, filed on Sep. 1, 2017, provisional application No. 62/527,479, filed on Jun. 30, 2017.

(51) Int. Cl.

| | | |
|---|---|---|
| *G06F 8/36* | (2018.01) | |
| *H04L 9/40* | (2022.01) | |
| *H04L 9/32* | (2006.01) | |
| *G06F 8/30* | (2018.01) | |
| *H04L 67/104* | (2022.01) | |
| *H04L 9/00* | (2022.01) | |
| *H04L 41/00* | (2022.01) | |

(52) U.S. Cl.
CPC .......... *H04L 9/3239* (2013.01); *H04L 9/3247* (2013.01); *H04L 63/101* (2013.01); *H04L 63/12* (2013.01); *H04L 67/104* (2013.01); *H04L 9/50* (2022.05); *H04L 41/20* (2013.01); *H04L 63/0823* (2013.01)

(56) References Cited

U.S. PATENT DOCUMENTS

| | | | | |
|---|---|---|---|---|
| 2018/0137306 A1* | 5/2018 | Brady | ................... | H04L 9/0643 |
| 2018/0167217 A1* | 6/2018 | Brady | ................... | H04L 67/34 |
| 2018/0374097 A1* | 12/2018 | Hanna | ................... | H04L 63/123 |
| 2019/0004789 A1* | 1/2019 | Mills | ................... | H04L 67/104 |
| 2019/0065709 A1* | 2/2019 | Salomon | ................... | G06F 8/71 |

FOREIGN PATENT DOCUMENTS

| | | |
|---|---|---|
| JP | 2018-128723 A | 8/2018 |
| JP | 2020-503598 A | 1/2020 |
| WO | WO2017079795 A1 | 5/2017 |

OTHER PUBLICATIONS

Fotiou Nikos et al, "Decentralized name-based security for content distribution using blockchains", 2016 IEEE Conference on Computer Communications Workshops (Infocom Wkshps), IEEE, Apr. 10-14, 2016.

Ori Jacobovitz, "Blockchain for Identity Management", (Jan. 12, 2016), URL:https://www.cs.bgu.ac.il/~frankel/TechnicalReports/2016/16-02.pdf.

IN Examination Report—Application No. 201947051495 Feb. 22, 2022.

Satoshi Nakamoto; www.bitcoin.org; "Bitcoin: A Peer-to-Peer Electronic Cash System"; 9 pages.

Manav Gupta; "Blockchain for Dummies®, IBM Limited Edition"; 2017 by John Wiley & Sons, Inc.; 51 pages.

\* cited by examiner

SYSTEM AND METHOD FOR MANAGING A PUBLIC SOFTWARE COMPONENT ECOSYSTEM USING A DISTRIBUTED LEDGER

CROSS REFERENCES TO RELATED APPLICATIONS

This application is a continuation of U.S. patent application Ser. No. 15/829,684 entitled SYSTEM AND METHOD FOR MANAGING A PUBLIC SOFTWARE COMPONENT ECOSYSTEM USING A DISTRIBUTED LEDGER, filed on Dec. 1, 2017 which claims the benefit of U.S. Provisional Patent Application Ser. No. 62/527,479, entitled SYSTEM AND METHOD FOR MANAGING A PUBLIC SOFTWARE COMPONENT ECOSYSTEM USING A DISTRIBUTED LEDGER, filed on Jun. 30, 2017, and U.S. Provisional Patent Application Ser. No. 62/553,406, entitled SYSTEM FOR MANAGING A PUBLIC SOFTWARE COMPONENT ECOSYSTEM USING BLOCKCHAIN FEATURES, filed on Sep. 1, 2017 which are hereby incorporated by reference as if set forth in full in this application for all purposes.

BACKGROUND

The present application relates to computing, and more specifically to computing ecosystems suitable for sharing computing resources, such as software components, among participants of the ecosystem.

Systems and methods for implementing and controlling software component ecosystems are employed in various demanding applications, including app stores and open source software development platforms. Such applications often demand efficient mechanisms for selectively processing and accounting for transactions that occur in the ecosystem, and then leveraging the transaction information to ensure efficient operation of the ecosystem.

Conventionally, computing ecosystems for exchanging content (e.g., software programs and components, data, objects, etc.) are either centrally controlled, such as by the proprietor of an app store, or relatively uncontrolled. However, centrally controlled ecosystems can suffer from various disadvantages, such as the cost of implementing a suitably robust central management infrastructure, managing scalability and disaster recovery on such systems, the general cost of staffing relating to their management, etc. Accordingly, a need remains for systems and methods for facilitating efficient implementation and control of computing ecosystems.

SUMMARY

An example embodiment discloses a system and method facilitating implementing a software component ecosystem using distributed control, in part by using a distributed blockchain ledger to maintain, secure, verify, update, monitor, or otherwise control or effect transactions, e.g., various types of registration transactions (as discussed more fully below) occurring in the distributed ecosystem. Ecosystem nodes (so-called or represented by catalog instances herein) of the distributed ecosystem run software for managing the shared blockchain ledger (also simply called the blockchain herein), including adding new blocks that include the one or more transactions.

An example method for facilitating implementing the software component ecosystem includes accepting one or more signals from a user input device to define an identifying name of a developer entity; accepting one or more signals from a user input device to define a secure verification mechanism that is usable to verify that the developer entity is authorized to register the identifying name; recording an entry in a catalog (e.g., a catalog implementing a node and accompanying distributed ledger), the entry including the developer name in association with the verification mechanism; performing component upload, download, or other component transfer in association with the catalog entry to transfer a software component; and using the catalog entry (e.g., developer entity registration transaction entry) to verify a transaction (e.g., committing the transaction to the distributed ledger) pertaining to the component upload, download, or other software component transfer, whereby data comprising the transaction is committed to the distributed ledger.

In a more specific embodiment, the example method further specifies that the secure verification mechanism includes a public key and digital signature associated with the developer entity. The recorded catalog entry is first placed into an unverified queue before replications of the catalog entry are propagated to multiple nodes in the software component ecosystem. Each of the multiple nodes represents a catalog instance that includes code for implementing a distributed blockchain ledger in concert with the other multiple nodes, which maintain replicas or approximate replicas of the distributed blockchain ledger.

Accordingly, certain embodiments discussed herein provide efficient mechanisms for facilitating registration of transaction data in a distributed ledger, e.g., distributed blockchain. Information pertaining to the transactions can be used to ensure trust of participants and associated components; to manage and verify component identity, integrity, provenance or origin, support status, etc.; to ensure that software components are properly licensed; to provide information as to available software support services; to approve users, such as consumers and/or contributors of the components; to prevent or mitigate problems that might occur when components with conflicting or confusing names are offered; to facilitate updating and/or recalling of software components; and so on, all without requiring use of a separately managed core controller.

A further understanding of the nature and the advantages of particular embodiments disclosed herein may be realized by reference of the remaining portions of the specification and the attached drawings.

BRIEF DESCRIPTION OF THE DRAWINGS

FIG. 6 shows an example UI display screen that may be displayed on a computing system, such as the user developer computing system of FIG. 3, and which provides various UI controls and options for browsing a catalog of software components, searching, downloading, editing, and deleting software components from the catalog, which is maintained by a catalog instance to which accompanying computing system has access to.

DETAILED DESCRIPTION OF EMBODIMENTS

Figure 1:
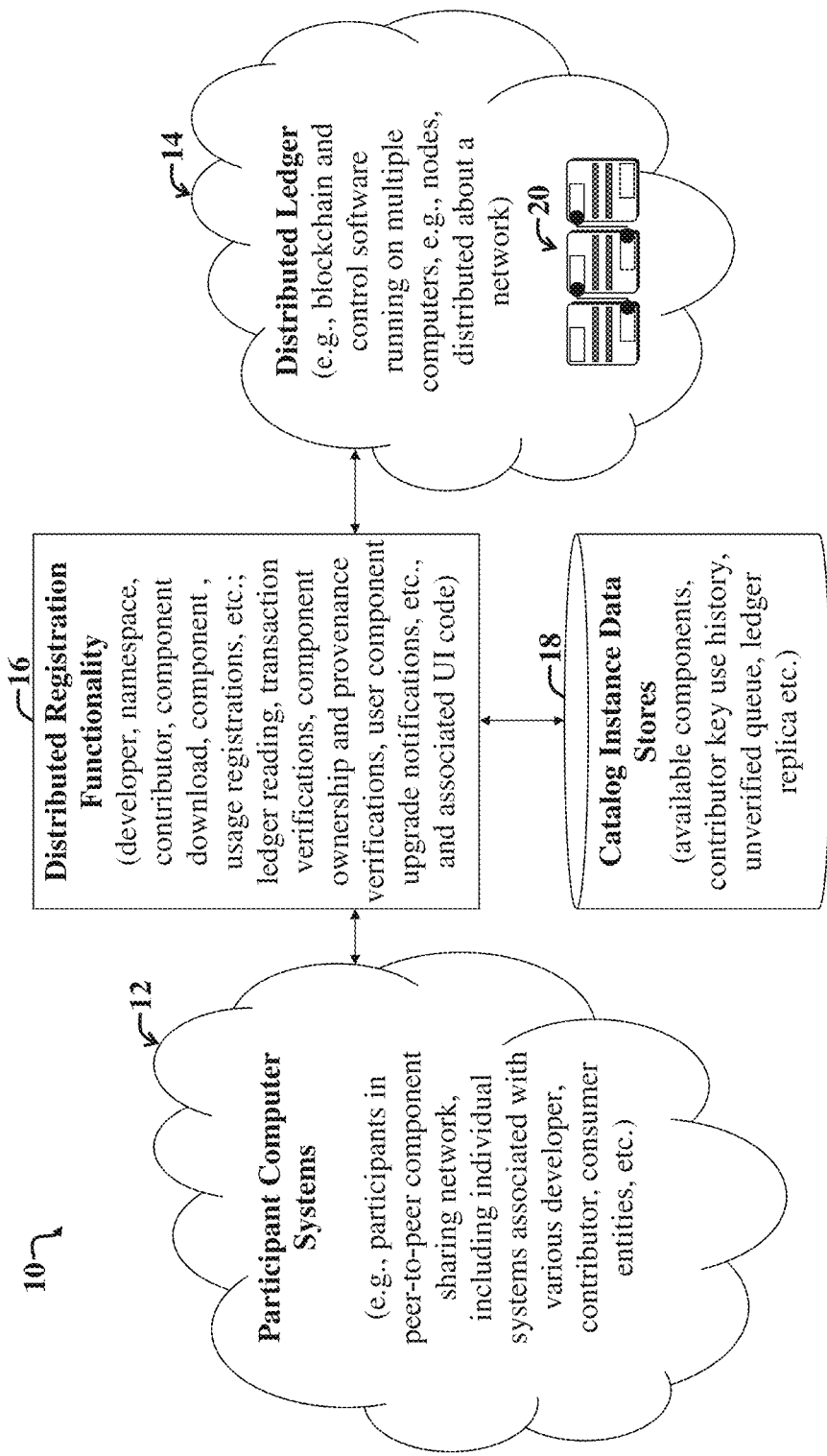
FIG. 1 illustrates a first example generalized peer-to-peer computing ecosystem for selectively sharing software components and for registering transactions using a distributed blockchain ledger.

For the purposes of the present discussion, a software component ecosystem may be any computing environment that includes a collection of networked distributed computing resources configured to enable uploading and/or downloading of software components to/from the distributed computing resources (e.g., catalog instances, accompanying distributed blockchain, etc.). A networked computing environment may be any computing environment that includes intercommunicating computers, i.e., a computer network, such as a local area network (LAN), wide area network (WAN, e.g., the Internet), cloud infrastructure and services, etc. Similarly, a networked software application may be computer code that is adapted to facilitate communicating with or otherwise using one or more computing resources, e.g., servers, via a network.

Note that collections of computing resources, e.g., computer systems that may intercommunicate via a network of the ecosystem, are called nodes herein. A given node, e.g., an instance of a software component catalog (called catalog instance herein), may include software for intercommunicating with other nodes and selectively sharing data (e.g., replicas of blockchains containing registration information for the ecosystem); for facilitating creation of transactions (e.g., via user interface software for guiding completions of various registrations), and for ensuring conformance with rules of the ecosystem, thereby enabling implementation of a peer-to-peer ecosystem.

For the purposes of the present discussion, a peer-to-peer network or ecosystem may be any collection of computing resources, e.g., computer systems and/or software applications, i.e., nodes, which are distributed across a computer network, and which may intercommunicate to facilitate sharing process workloads.

Note that conventionally, peers or nodes of a peer-to-peer network have similar privileges to access data and functionality provided by the network. However, as the term is used herein, peers or nodes of a peer-to-peer network need not be similarly privileged. For example, some nodes, called full nodes, are maximally privileged, i.e., maintain privileges to read from the ecosystem blockchain and write thereto. Other less privileged nodes may require use of a full node as a proxy to access the ecosystem blockchain. Note that the terms "peer-to-peer network" and "peer-to-peer ecosystem" may be employed interchangeably herein.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object associated with a transaction); performing an enterprise-related task, such as promoting, hiring, and firing enterprise personnel, placing orders, calculating analytics, launching certain dialog boxes, performing searches, and so on.

A blockchain may be a sequenced list of linked records, called blocks, wherein the blockchain can grow by adding new blocks to an end of the blockchain, but the insertion of earlier blocks is prohibited unless later blocks are first unwound or removed from the blockchain. Different blocks of a blockchain are often timestamped upon incorporation into the blockchain. Blockchains may be implemented using distributed or networked software applications, e.g., which may be installed on nodes of a given computing environment or ecosystem. The links between blocks may be implemented via implementation of one or more hashes applied to new blocks, wherein the one or more hashes leverage or use information from one or more previous blocks. Blockchains can be used to implement distributed ledgers of transactions.

For the purposes of the present discussion, a distributed ledger may be a collection of shared digital data, which is shared among plural nodes of a network, copies of which may be replicated and stored among the plural nodes. Data maintained by a distributed ledger may be synchronized among the nodes.

Accordingly, a distributed ledger may act as a type of distributed database, i.e., mechanism for storing data among different entities coupled to a network of the entities. A node may be any computer system and/or software application and/or software system, or groups thereof that are coupled to a network. The nodes discussed herein are generally called "catalog instances," as they facilitate access to data stored in the catalogs by other nodes and/or participants of the accompanying computing ecosystem.

A transaction may be any collection of information describing an event, status, property, or other information, descriptive of one or more aspects of the ecosystem, wherein the one or more aspects may include participating developer entities, software component consumer entities, contributor entities, proxied ecosystem participants and systems, software component interrelationships, instances of software component downloads and/or uploads, support status of a software component, component provenance information, and so on. Depending upon the context in which the term is used, a transaction may refer to a collection of data describing an activity in the ecosystem, e.g., a developer entity registration, a namespace registration, a contributor registration, and so on; or alternatively, a transaction may refer to the actual activity, e.g., downloading a component.

Transactions representing activities or tasks may be fully automated or may also contain human workflow tasks such as manual approvals or other verification activities. Thus, although a transaction may be expressed as a single thing (e.g., collection of information) in the blockchain, some forms of transaction may actually be broken down into discrete sub-transactions which can be recorded in the ledger as the workflow is processed. Accordingly, depending upon the context in which the term is used, the term "transaction" may also refer to the act of conveying a collection of information (e.g., computing object) and may also refer to the actual collection of the information (e.g., computing object).

For example, if an individual software developer (e.g., a component contributor) registers with a component ecosystem, as discussed herein, information pertaining to (e.g., documenting) the contributor registration process may be propagated to one or more unverified queues of catalog instances in preparation for incorporation into the blockchain of the ecosystem. The collection and/or transfer of the information may be called a transaction, and the computing object maintaining the collected information may also be called the transaction, e.g., developer registration transaction. With reference to FIG. 1, such transactions can be collected (e.g., by registration functionality 16) and the selectively committed to one or more blocks of the blockchain 20 of the distributed ledger 14.

Note that the blockchain 20 and distributed ledger 14 may be equivalent in certain implementations. However, in the present example embodiment, the distributed ledger 14 is shown as including the blockchain 20, as the distributed ledger 14 may include additional functionality, as opposed to mere implementation of the blockchain 20. For example, in certain implementations, the distributed ledger 14 may include additional code for allowing conversion of the blockchain 20 into other database formats for local use by nodes of the participant computer systems 12; may allow for selective distribution of components to different instances of the catalog instance data stores 18, and so on.

A given node may be allocated different privileges in a given computing environment or ecosystem. Nodes with similar privileges, as it pertains to implementation of one or more particular tasks, are called peers for the purposes of completing the tasks. For the purposes of the present discussion, a peer-to-peer ecosystem may be any ecosystem or computing environment implemented, at least in part, via one or more distributed or networked software applications implemented via different nodes or peers of the of ecosystem.

Various example embodiments discussed herein are implemented via a peer-to-peer software component ecosystem that includes nodes of software component catalog instances. Example software component catalog instances, discussed more fully below, may run various software applications, including software for maintaining and managing a local data store (which may include a database of software components); software for implementing security and permissions functionality; software for generating User Interface (UI) display screens for enabling various types of registrations (examples of which are discussed more fully below); for managing unverified transaction queues for the ecosystem; for communicating with other catalog instances; for maintaining replicas of the ecosystem blockchain; for computing, i.e., verifying or validating new blocks for the blockchain of the ecosystem; for submitting transactions for verification (and inclusion in a blockchain block) by one or more catalog instances of the ecosystem; for implementing any algorithms for selection of catalog instances to perform computations required to add one or more blocks to the blockchain; for computing hashes required to add blocks to the blockchain, and so on.

Generally, communities of developers and/or businesses may use software component ecosystems to cooperatively interact with a shared market for software and services using a common technological platform, which enables or facilitates exchange of information, resources and components.

A software component ecosystem can implemented as an open ecosystem of reusable software components for use by developers, vendors and customers. Such an ecosystem may be built around networked or "cloud" infrastructure and accompanying processes and services. However, although specific embodiments of the invention may be described with reference to specific processing platforms, techniques and infrastructures, other variations are possible and may be adapted for different systems.

One design for a software component ecosystem includes consideration of various aspects such as trust, identity, integrity, support, namespace, component identity, intellectual property, product recall, provenance and licensing. Features for other aspects can also be included. Although various features and aspects are described with reference to specific embodiments, it should be apparent that specific embodiments can use different sets of the described features. Features may be omitted or modified, and additional features might be included.

Certain embodiments discussed herein provide an apparatus, storage media, and method for implementing a software component ecosystem by accepting one or more signals from a user input device to define an identifying name of a developer entity; accepting one or more signals from a user input device to define a secure verification mechanism; recording an entry in a catalog, the entry including the developer name in association with the verification mechanism; performing a transaction in association with the catalog entry to transfer a software component; and using the catalog entry to verify the transaction. Additional features allow a namespace to be allocated to an entity defined by an entry in the catalog.

Conventionally, software developers may subscribe to certain cloud services to facilitate development of software applications and storage of associated files. A cloud service that is configured for software application or process flow development is called a Process Cloud Service (PCS) herein.

A process cloud service may employ a networked database to store files and other objects used by a given software program being developed. Server-side development environments may be accessible to developers via a browser. The development environments may be backed by the PCS, such that developed software application files are stored in the PCS database.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on. Examples of computing resources include data and/or software functionality offered by one or more web services, Application Programming Interfaces (APIs), etc.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

Certain embodiments discussed herein are particularly useful for development, deployment, and implementation of process-based software applications. A process-based software application may be any software application definable by one or more sequences of steps, also called process elements or software activities. The terms "process element," "flow element," "software element," and "software process element" may be employed interchangeably herein to refer to any step, e.g., event, activity, gateway, subprocess, and so on. A sequence of steps of a process-based software application may be called a process flow. Process flows are often modeled and illustrated via swim lanes in a User Interface (UI) display screen. Process-based applications are often implemented via composite applications that may leverage different web services and associated software components for different process steps.

Generally, a popular form of software and product development may be referred to as a "software ecosystem." A software ecosystem may include a set of developers and/or businesses functioning cooperatively and interacting with a shared market for software and services, together with relationships among them. These relationships can include a common technological platform and operate through the exchange of information, resources and components.

A software component ecosystem may be a particular type of software ecosystem, which includes, as a major characteristic, the development and exchange of software components. In a software component ecosystem it can be desirable to foster an open ecosystem of reusable software components for use by developers, partners and customers. Often, such an ecosystem will be built around networked or "cloud" infrastructure, processes and services. However, although specific embodiments of the invention may be described with reference to specific processing platforms, techniques and infrastructures, other variations are possible and may be adapted for different systems.

For clarity, certain well-known components, such as hard drives, processors, operating systems, power supplies, routers, Internet Service Providers (ISPs), workflow orchestrators, process schedulers, process clouds, business process management systems, ecosystem developer entities, ecosystem contributor entities, ecosystem consumers, Integrated Development Environments, proxy systems, identity management systems, Certificate Authorities (CAs), and so on, are not necessarily explicitly called out in the figures. However, those skilled in the art with access to the present teachings will know which components to implement and how to implement them to meet the needs of a given implementation.

FIG. 1 illustrates a first example generalized peer-to-peer computing ecosystem 10 for selectively sharing software components (as stored in one or more catalog instance data stores 18) and for registering transactions using a distributed blockchain ledger 14, 20.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while example registration functionality 16, catalog instance data stores 18, and the distributed ledger 14 are shown (for clarity) separately from the participant computer systems 12, that in practice, such entities are implemented via one or more participant computer systems 12, which participate in the associated peer-to-peer network.

The participant systems 12 may include developer entities (e.g., corporations or organizations with individual developers). Developer entities may include so-called contributors, who contribute code, e.g., software components, to one or more so-called catalog instances that are used to implement the registration functionality 16 and enable developer interaction with (e.g., uploading, downloading, etc.) software components maintained in the one or more catalog instance data stores 18. Developer entities and associated developers may also download (i.e., consume) software components from the local catalog instances.

A person or entity that downloads a software component from a catalog instance data store 18 is called a consumer. A person or entity that uploads a software component to the catalog instance data store 18 is called a contributor. Generally, as the term is used herein, developer entities may include both contributors and consumers or just contributors. However, an entity that acts only as a consumer of software components is not called a developer entity herein.

When a developer entity registers with a catalog instance, e.g., using the registration functionality 16; and a consumer thereof downloads a software component to the local catalog instance data store 18; or a contributor thereof uploads a software component the local catalog instance data store 18; and so on, data pertaining to these activities, once verified, is registered in the distributed ledger 14 and accompanying verified blockchain 20.

Note that in certain embodiments, registration of a developer entity generates a so-called developer entity registration transaction. The developer entity registration transaction may be followed by namespace registration (which, alternatively, may be part of the developer entity registration in certain implementations). During namespace registration, e.g., using the registration functionality 16, a namespace is associated with a developer entity, and the corresponding information is stored in the distributed ledger 14 as a namespace registration.

After developer entity registration and associated namespace registration, individual contributors and consumers may then register in association with the associated developer entity and namespace. A separate upload transaction can be used when a contributor uploads an already registered software component to another catalog instance, i.e., a catalog instance other than the local catalog instance with which the developer entity is directly communicating with.

Various other types of registrations are also possible, including, but not limited to, component download transactions, component usage registrations, and so on. In general, information pertaining to each type of registration is, after verification, is committed to the blockchain 20 of the distributed ledger 14, as discussed more fully below The distributed ledger 14 allows devolving of administrative (e.g., node management, identity management, etc.) tasks to catalog instances (e.g., as collectively represented by items 14-18 in FIG. 1) and/or to local identity domains, while enabling participant access to a consistent view or summary of transactions pertinent to the associated ecosystem 10, i.e., via transactions registered in the blockchain 20 of the distributed ledger 14.

In the present example embodiment, transactions within the distributed ledger 14 are permissioned according to the role associated with the entity and/or registrar of a transaction submitted thereto. Transactions may be further permissioned in accordance with the nature of a node (e.g., catalog instance) used for the transaction. For example, some nodes may be full nodes, whereas other nodes may have reduced privileges to access and participate in verifying blocks of the blockchain 20.

Example roles that may be permissioned differently include a community leader role (which may be responsible for developer entity identity verification; verification of namespace allocations to developer entities, and so on); developer role (which may be responsible for registration and/or management of developer entity identities, contributors, component identities, and so on); distributor role (which may be responsible for component usage registrations); consumer (which may partake in component usage registration), and so on.

Note that in distributed and peer-to-peer systems, such as the ecosystem 10, transaction registrations and associated data registration can be important. Data, e.g., data pertaining to registrations and associated software components, exists in multiple locations, i.e., the data is replicated among full nodes of the participant computer systems 12.

Accordingly, if data, e.g., transaction data, is changed by one node, it can be important that the change (and associated transaction) is propagated to all full nodes of the participant computer systems 12. If the transaction data pertains to a software component registration, it can be impractical to store the actual entire software component in a transaction that is committed to the distributed ledger 14 and accompanying blockchain 20. Accordingly, a hash of a file (i.e., distribution medium) used to store a given software component may be registered in the blockchain 20, i.e., for software component registrations.

Figure 2:
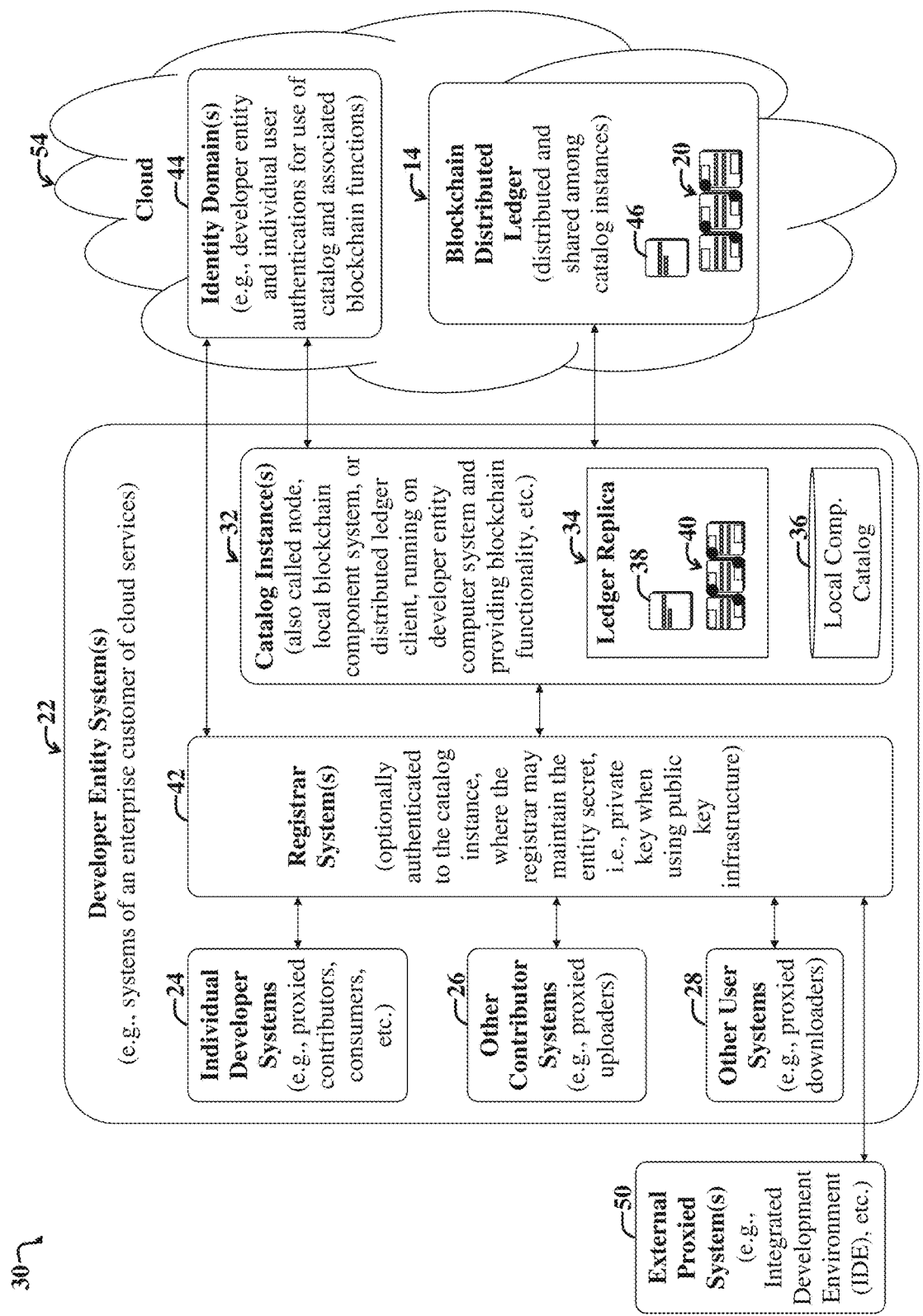
FIG. 2 is a more detailed diagram illustrating an example implementation of the first example peer-to-peer computing ecosystem of FIG. 1.

FIG. 2 is a more detailed diagram illustrating an example implementation 30 of the first example peer-to-peer computing ecosystem 10 of FIG. 1. With reference to FIGS. 1 and 2, the example implementation 30 of FIG. 2 is shown as including developer entity systems 22 and external proxied systems 50, which comprise participant computer systems 12 of FIG. 1.

The developer entity systems 22 communicate with a cloud 54 of participant systems (e.g., systems 12 of FIG. 1) implementing the distributed ledger 14. In the present example implementation 30, the cloud 54 further includes one or more identity domains 44, which may be used to authenticate developer entities and individual users in advance of enabling access to the distributed ledger 14 and accompanying blockchain 20 (e.g., via a catalog instance 32) for the purposes of reading committed transactions and for committing transactions to the blockchain 20.

Note that in certain implementations, the catalog instance 32 may also be authenticated and permissioned (for selective interaction with other catalog instances and selective implementation of predetermined sets of functionality associated with predetermined permissions).

The example developer entity system(s) 22 represent one or more computing systems of a developer entity, e.g., an enterprise or organization that can partake in various operations of the accompanying peer-to-peer network and associated ecosystem 30. For the purposes of the present discussion, a developer entity may represent a group of one or more people and accompanying computing systems and computing resources, which can be registered as such an entity using one or more of the catalog instances 32. In the present example embodiment, a developer entity is associated with privileges to upload software components (contribute) and download (consume) software components from a local component catalog 36 of the catalog instances 32, e.g., via individual contributors and/or consumers who are registered in association with the developer entity of the developer entity systems 22.

A developer entity, e.g., a corporation, is associated with a namespace, e.g., which may include the name of the corporation. A given namespace may include a hierarchical structure of names, which may include names of various software components associated with the name of the developer entity (which may be the highest level node in a hierarchical namespace of a given developer entity).

Note that other types of entities; not just developer entities and associated systems 22 may participate in the ecosystem 30, without departing from the scope of the present teachings. Note that while only developer entity systems 22 and external proxied systems 50 (which are proxied by one or more of the developer entity systems 22 for use of the one or more catalog instances) are shown in FIG. 2, other types of systems may partake in the ecosystem 30.

In the present example embodiment, the developer entity system 22 includes one or more computing systems (e.g., actual computers and/or virtual machines) hosting a full node of the ecosystem 30. The full node is represented by the catalog instance 32. For the purposes of the present discussion, a full node may be any node that has full read, write, and commit privileges for accessing data and providing data, e.g., transaction data, to the blockchain distributed ledger 14.

The example catalog instance 32 includes a ledger replica 34, which is a replica of the blockchain distributed ledger 14 that is replicated or propagated to other nodes (catalog instances) of the accompanying ecosystem 30. The ledger replica includes an unverified queue 38, which may contain one or more unverified transactions that are pending for committal to the blockchain replica 40. Note that data of the local unverified queue 38 and blockchain replica 40 is shared among or otherwise propagated to other nodes, after which, they become representative the distributed unverified queue 46 and associated blockchain distributed ledger blockchain 20 of the cloud 54.

The example catalog instance 32 further includes or communicates with a local component catalog 36. The local component catalog 36 maintains software components that have been uploaded to the catalog instance 32 and which may be downloaded by privileged consumers of the components in the local component catalog 36. Each interaction with the local component catalog 36 is accompanied by an associated transaction documenting the interaction, as discussed more fully below.

A given transaction is first loaded into the unverified queue 38; propagated to other unverified queues 46 of other catalog instances (nodes); then, once transaction validity checks are performed, committed to the overall representative distributed blockchain 20. The transaction-committing process involves use of one or more catalog instances 32 to compute one or more hashes for transaction collections and one or more hashes for associated blocks of the blockchain 20 to which the transaction collections will be committed. The transaction collections to be committed to the blockchain 40, 20 are culled from the unverified queues 38, 46.

The developer entity system(s) 22 further include one or more registrar computing systems 42, which communicate with the one or more catalog instances 32. In the present example embodiment a registrar system 42 may be any computing system that is authorized (or is used by a person who has been authorized) to submit registrations to the one or more catalog instances 32. Note that catalog instances 32 running on one or more computing systems of a developer entity of the developer entity systems 22, are called local catalog instances, to the extent that they are local the developer entity of the developer entity systems 22.

Note that a registrar of the registrar systems 42 may be authenticated to act as a registrar on behalf of the developer entity of the developer entity systems 22 through one or more cloud-based identity domains 44. The registrar may maintain developer entity secret(s) (e.g., private key, when using Public Key Infrastructure (PKI)).

The registrar systems 42 may act as proxies (e.g., for the purposes of transaction registrations) for individual developer systems 24 (e.g., computing systems used by individual software component contributors and/or consumers), other contributor systems 26 (e.g., proxied uploaders), and other user systems 28 (e.g., proxied downloaders), which are part of the developer entity of the developer entity systems 22.

Furthermore, in certain implementations, the registrar systems 42 may also act as a proxy (or proxies) for external proxied systems 50, which are not necessarily part of the developer entity systems 22. For example, an outside Integrated Development Environment (IDE) may, in some cases, be authorized to use the developer entity's registrar systems 42 as an interface to interact with one or more of the catalog instance(s) 32 and accompanying local component catalog(s) 36.

In an example use case scenario, the developer entity (e.g., the proprietor of the developer entity systems 22) initially registers with the catalog instance 32 as a developer entity, in a process called developer entity registration, as discussed more fully below with reference to FIGS. 4-5. Associated developer entity registration information is then packaged as a transaction and submitted to the unverified queue 38 of the local blockchain ledger replica 34, in preparation for validity checks on the transaction and eventual committal as a verified transaction to the local blockchain 40 and accompanying distributed blockchain 20.

Developer entity registration may be followed by various additional types of registration, e.g., developer entity namespace registration, whereby the name (and/or other namespaces) of the developer entity of the developer entity systems 22 is/are registered.

Registration for individual contributors (e.g., an individual developer of the developer entity of the developer entity systems 22) may occur next. Contributors are registered with the blockchain 20 in association with the registered developer entity name and/or additional requested (by the contributor) namespaces. A public key and digital signature (e.g., as may be obtained via the identity domain 44 and accompanying Certificate Authority (CA)) for a particular contributor may also be provided to facilitate confirming the authenticity of the registration, i.e., that the contributor is authorized and permissioned properly for use of the catalog instance 32 and accompanying software component functionality (e.g., downloading and uploading of software components) afforded by the local software component catalog 36.

Other types of registrations and associated transactions include software component registration (e.g., as may occur in preparation for uploading of a software component to the local component catalog 36); consumer component download registration in combination with optional component usage registration; and component usage registration.

Still, other types of registrations are possible, without departing from the scope of the present teachings. For example, registrations tracking software component nesting usage (e.g., when one software component is used within another); registration of local component catalog state information (e.g., listing of available software components in the local component catalog 36) and afforded functionality, and so on.

In general, by collecting various types of registration information in the blockchain distributed ledger 14, many benefits may follow for the entire ecosystem 30. For example, use of embodiments discussed herein may facilitate avoiding name collisions between software components; efficient management of component support services, including ensuring that a particular component is supported by a third party supplier, how it is supported, and how to selectively recall it; detection of component tampering; enforcing intellectual property rights and tracking component provenance and ownership; checking whether or not a software license for a particular component is valid; generally enabling verification of component validity; and so on. This can all be achieved without the need for a conventional centrally controlled mechanism, which can be substantially replaced and enhanced via use of distributed catalog instances 32 as discussed herein.

Figure 3:
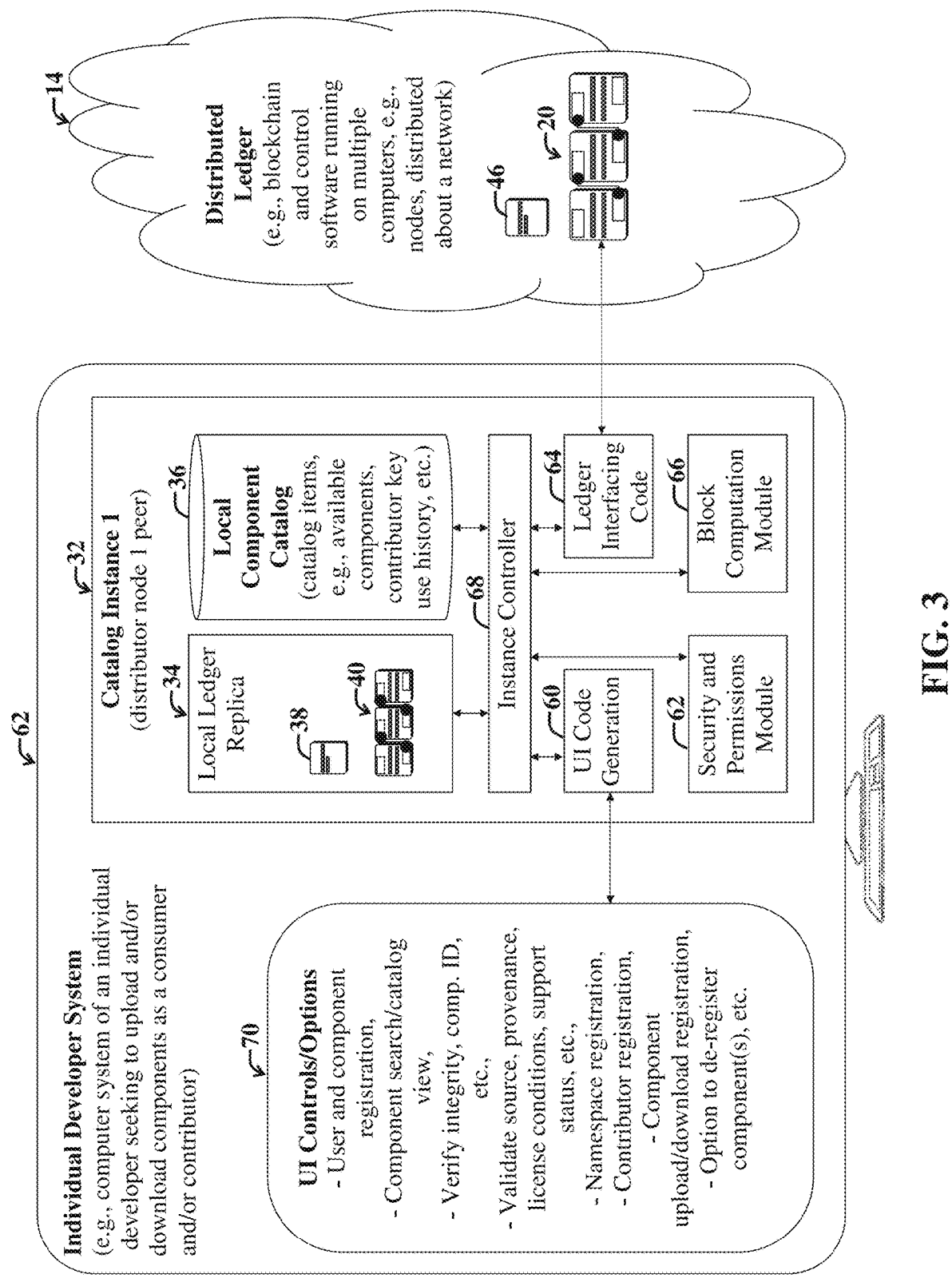
FIG. 3 shows example details of an individual developer computing system acting as a peer or node of the peer-to-peer computing ecosystem of FIGS. 1-2, including example User Interface (UI) controls and options, and example modules that may be included in a catalog instance that used to couple user developer computing system to the peer-to-peer ecosystem, whereby the user developer computing system acts as a node of the peer-to-peer ecosystem.

FIG. 3 shows example details of an example individual developer computing system 62 acting as a peer or node of the peer-to-peer computing ecosystem 10, 30 of FIGS. 1-2, including example User Interface (UI) controls and options of an example UI display screen 70, and example modules 34-40, 60-68 that may be included in a catalog instance 32 that is used to couple individual developer computing system 62 to the peer-to-peer ecosystem (which may be represented by the cloud 14 in combination with the developer system 62), whereby the individual developer computing system 62 and accompanying catalog instance 32 acts as a node of the overall peer-to-peer ecosystem.

Note that for illustrative purposes, the catalog instance 32 is shown running on the individual developer system 62. However, in practice, the individual developer system 62 may be owned by or otherwise associated with a developer entity of the developer entity systems 22 of FIG. 2. Accordingly, the individual developer system 62 may represent one of the developer entity systems 22 of FIG. 2.

In the present example embodiment, the individual developer system 62 acts as both a node of the accompanying peer-to-peer ecosystem, and a system of an individual software component contributor and/or consumer. Note that in the present embodiment, the individual developer of the developer system 62 also acts as a registrar, with access to the catalog instance 32 and associated functionality, for the purposes of implementing transaction registrations; not just software component download and/or upload operations to/from the local component catalog 36.

The example developer system 62 includes the catalog instance (called the first catalog instance, or catalog instance 1 herein) 32 in communication with a UI display screen 70. The catalog instance 32 further communicates with the distributed blockchain ledger 46, 20, running on a network or cloud 14 hosting the accompanying peer-to-peer ecosystem.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A UI control may be any displayed element or component of a user interface display screen, which is adapted to enable a user to provide input, view data, and/or otherwise interact with a user interface. Additional examples of user interface controls include buttons, drop down menus, menu items, tap-and-hold functionality, and so on. Similarly, a user interface control signal may be any signal that is provided as input for software, wherein the input affects a user interface display screen and/or accompanying software application associated with the software.

The example catalog instance 32 includes the local ledger replica 34, which includes a replicated (replicated among other catalog instances or nodes) unverified queue 38 and blockchain replica 40 of the distributed blockchain 20. The catalog instance 32 further includes a local component catalog 36 (e.g., which may be implemented via a relational database or other type of database), a UI code generation module 60, a ledger interfacing module 64, a security and permissions module 62, and a block computation module 66. A catalog instance controller 68 facilitates interfacing, controlling, and routing intercommunications between various other modules 34, 36, 60-66 of the catalog instance 32.

The example UI display screen 70 and accompanying UI controls and options include UI controls for facilitating contributor and consumer registrations; component registrations; component searches and/or views of software components available in the local component catalog 36; verifications of component integrity, component identifications, etc.; validation of software component source, provenance, license conditions, support status, etc.; developer entity namespace registrations; contributor registration; component upload and/or download registrations; UI controls or options to de-register software components, and so on.

Note that the exact number and types of UI controls available via the example UI display screen 70 are implementation specific, and may vary, depending upon the needs of a given implementation, without departing from the scope of the present teachings. Furthermore, one or more of the UI controls and options 70 may be implemented via plural UI display screens (e.g., in the form of wizards).

In the present example embodiment, the various UI controls and options of the UI display screen 70 are generated based on rendering instructions from the UI code generation module 60 of the catalog instance 32.

The security and permissions module 62 may facilitate individual user and developer entity authentications and permissioning in view of rules established by a developer entity of the individual developer system 62. The security and permissions module 62 may further communicate with one or more identity domains 44 of FIG. 2 to facilitate implementing various security and permissions functions. Note that the exact functions performed by the security and permissions module 62 are implementation specific and may vary, depending upon the needs of a given implementation.

The block computation module 66 of the catalog instance 32 includes code for facilitating computation of hashes for pending transactions in the local unverified queue 38 and for computing hashes for blocks of the blockchain 40, 20, when the catalog instance 32 is selected (e.g., in accordance with a consensus algorithm or by round-robin selection) to compute, i.e., verify the next block of transactions for inclusion in the distributed blockchain 20 of the distributed ledger and accompanying computing cloud and ecosystem 14.

The ledger interfacing module 64 includes code for facilitating propagating new transactions entering the unverified queue 38 to the unverified queues 46 of other catalog instances, i.e., nodes of the ecosystem. The ledger interfacing module 64 further includes code for replicating the distributed blockchain 20, and maintaining an up-to-date replica 40 of the blockchain 20.

The local component catalog 36 maintains software components that may be selectively downloaded by authorized consumers. Software components may be uploaded to the local component catalog 36 by authorized and registered contributors, in association with a registered developer entity namespace and corresponding registered developer entity.

Figure 4:
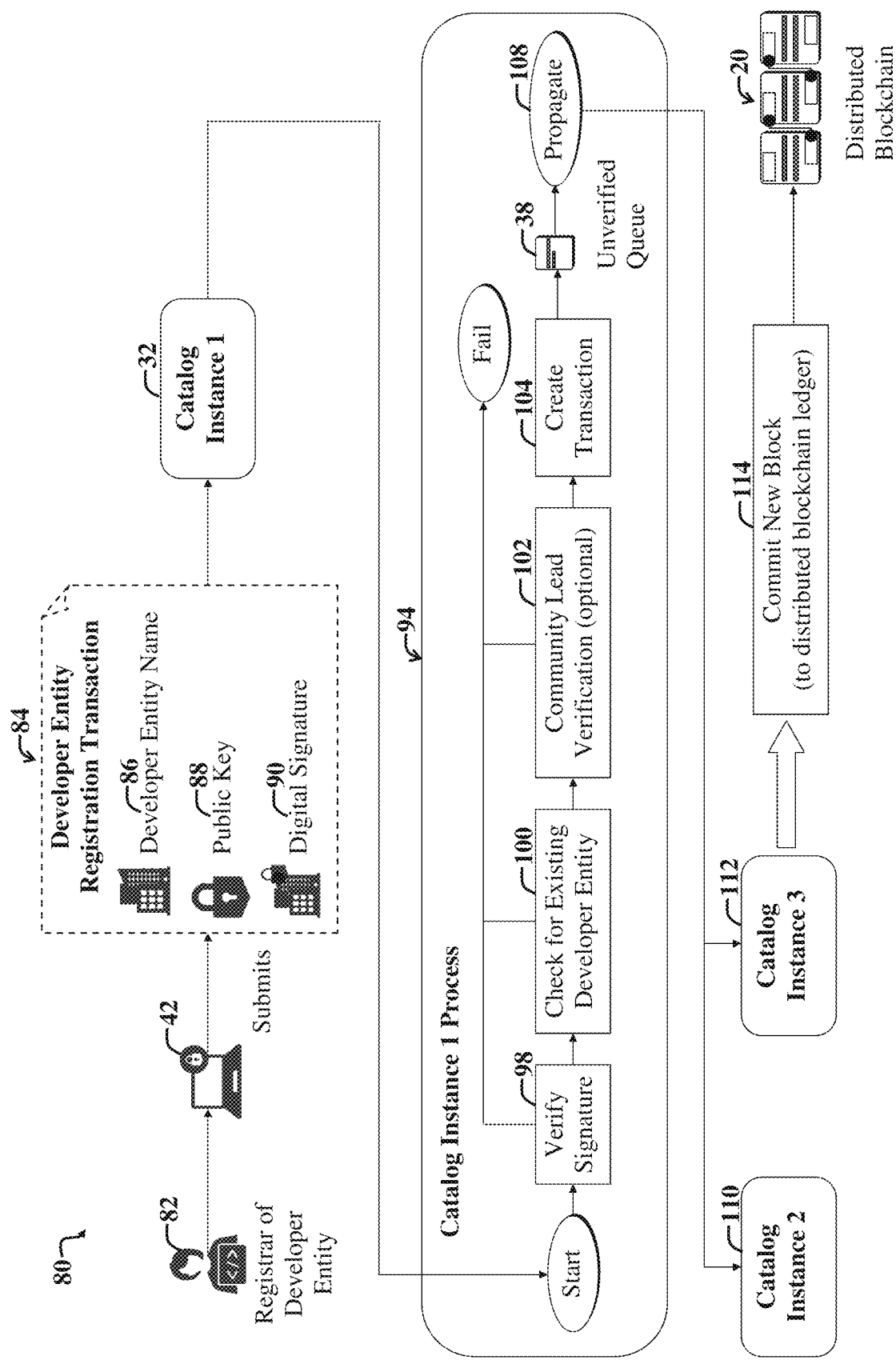
FIG. 4 shows a second example ecosystem and accompanying catalog instance process for registering a developer entity with the distributed blockchain ledger using the embodiments of FIGS. 1-3, wherein the second example system may be implemented in accordance with the embodiments of FIGS. 1-3.

FIG. 4 shows a second example system 80 and accompanying catalog instance process 94 for registering a developer entity, and accompanying developer entity registration transaction 84, with the distributed blockchain ledger 20 of FIGS. 1-3, wherein the second example system 80 may be implemented in accordance with the embodiments of FIGS. 1-3.

In the example system 80, a registrar 82, e.g., corresponding to a user of the registrar system(s) 42 of FIG. 2, uses a registrar system 42 and accompanying UI display screen and options 70 of FIG. 3 to submit a developer entity registration transaction 84. The developer entity registration transaction 84 includes a developer entity name 86 (e.g., corresponding to the developer entity of the developer entity systems 22 of FIG. 2), a public key 88 of the developer entity, and a digital signature 90 of the developer entity.

Note that the digital signature 90 may be implemented in accordance with Public Key Infrastructure (PKI) and may include a private key of the developer entity being registered. The digital signature facilitates confirmation that the registrar 82 is submitting registration on behalf of an authorized (e.g., by an identity domain and accompanying certificate authority, e.g., the identity domain 44 of FIG. 2) developer entity, i.e., authorized to register with the distributed blockchain ledger 20 and accompanying distributed ecosystem.

In the present example embodiment, the registrar 82 submits the developer entity transaction 82 to a first catalog instance, e.g., the catalog instance 32 of FIG. 3. The first catalog instance 32 then runs an initial developer entity registration process 94 before propagating the transaction 84 to unverified queues of other catalog instances 110, 112, for eventual committal 114 to the distributed blockchain 20 by a selected catalog instance (e.g., the first catalog instance 32, a second catalog instance 110, or a third catalog instance 112). The selected catalog instance (e.g., the third catalog instance 112) may employ its blockchain computation module (e.g., the module 66 of FIG. 3) to compute transaction hashes and block hashes so as to commit the transaction 84 to the distributed blockchain ledger 20.

The initial developer entity registration process 94 includes various steps 98-108, as a form of pre-processing of the developer entity registration transaction 84 before submittal of the transaction 84 to a catalog instance for subsequent committal of the transaction the distributed blockchain ledger 20. An initial signature verification step 98 involves verification of the digital signature 90, e.g., with reference to a Certificate Authority (CA) of an identity domain (e.g., the identity domain 44 of FIG. 2).

After the digital signature 90 is verified, the process 94 checks the distributed blockchain 20 and/or any accompanying unverified queues 106 for any existing developer entity registrations of the same developer entity name 86. If any other similar developer transactions have been previously registered (or otherwise currently exists in the current unverified queue), the current developer entity registration process 94 is aborted due to conflict detection.

Subsequently, an optional community lead verification step 102 involves further checking, with an optional community lead (of the ecosystem), whether the community lead has any objections to registration of the developer entity transaction 84 with the distributed blockchain 20. The community lead may optionally block the developer entity registration transaction 84 for any reason that the community lead has be authorized (or permissioned) to block transactions.

After the optional community lead verification step 102, the registration transaction 84 is packaged and hashed for inclusion in the unverified queue, e.g., via a transaction creation step 104. Note that if any of the steps 98-102 fail to complete, the developer entity transaction registration process 94 is aborted.

After the developer entity registration transaction 84 is submitted to the local unverified queue 38, it is propagated, in a propagation step 108, to other catalog instances 110, 112 and accompanying unverified queues (e.g., queues 46 of FIG. 3), in preparation for committal processing 114, whereby a collection of one or more pending transactions in the unverified queue 38 and corresponding replicas (e.g., replicas 46 of FIG. 2) are processed for committal as one or more blocks of the distributed blockchain 20.

Note that in the present example embodiment, a given catalog instance 32, 110, 112 may already have access to identity information for every user and participant entity of the system 80, as the entities are provisioned via one or more cloud identity domains (e.g., the domain 44 of FIG. 2).

Note that use of the cloud identity domain 44 of FIG. 2 is optional, to the extent that it may be omitted in certain implementations. For example, alternatively, users and entities could be identified by other means than that of a cloud identity domain. Furthermore, in other embodiments, certain users may remain unidentified or anonymous.

Nevertheless, in the present example, each user and entity is associated with a predetermined identity within the identity domain 44 of FIG. 2.

The present example embodiment distinguishes and relates permissions associated with an individual developer role and permissions associated with a developer entity that represents and organization of individuals.

It is possible that multiple individuals may develop components for a single entity (e.g. a corporation), and as such, identities of the multiple individuals will be mapped to or associated (across one or more identity domains) with a particular developer entity identity, which may be used for software component ownership and validity verification purposes.

Nevertheless, the distributed blockchain 20 records a mapping or association between an identifier for a developer entity with a public key. In the present example, embodiment, the stored identity represents the identity of a developer entity. A particular individual who writes and/or uploads a software component to a catalog instance (and registers the component and the upload with the blockchain 20) is called a contributor.

Accordingly, the developer entity registration process 94 represents a self-registration of a developer entity. The registrar 82 may be any user who has access to the system 80 and who wishes to register a developer entity.

Hence, the example developer entity registration process 94 (which may vary depending upon the demands of a particular implementation) includes, after having optionally authenticated the registrar 82, employing a "create developer entity" UI and accompanying UI controls (e.g., as may be included among the UI controls and options 70 of FIG. 3) to supply information 84 about the developer entity, e.g., at least an identifying name, but possibly contact information, etc. Additionally, the registrar 82 also supplies the public key 88, and signs the transaction digitally, e.g., resulting in the digital signature 90 with the claimed key (e.g., developer entity private key).

The catalog instance process 94 then verifies the signature 90 using the supplied public key (at step 98), thereby proving that the registrar 82 possess both halves of the secret (e.g., both public and private keys associated with the developer entity being registered). Subsequently, (at step 100), the catalog instance 32 checks the associated catalog data store (e.g., the local component catalog 36 of FIG. 3 and/or the local unverified queue 38 and/or local blockchain replica 40 of FIG. 3) to ensure that the developer entity has not already been defined or is in the process of being defined.

Optionally, the community lead verification step 102 verifies the claim corresponding to the developer entity transaction 84. For example, in certain implementations, additional manual steps (e.g., paperwork to be signed) may be required to complete the developer entity registration pre-process in advance of committal of the transaction 84 to the distributed blockchain 20. Finally the registration transaction is created and/or formatted (at step 104) and propagated (at step 108) to other catalog instances 110, 112.

After propagation, a given registration transaction will sit in replicas of unverified queues (e.g., the unverified queue 46 of FIG. 3) until committal to the distributed blockchain 20. The created transaction is propagated to all other full nodes (e.g., catalog instances 110, 112) of the ecosystem as an untrusted, i.e., unverified transaction. The unverified queue 38 may enable placing into dispute unverified transactions until the unverified transactions of the unverified queues are committed to the blockchain 20.

After committal of a developer entity transaction 84 to the distributed blockchain 20, the associated developer entity is considered to be trusted enough to enable initiation of additional transactions that rely upon the identity of the developer entity, as maintained in the developer entity registration transaction 84, which is now committed to the distributed blockchain 20.

In summary, FIG. 4 illustrates basic components in a system 80 to create a ledger entry for an identity of a developer entity, i.e., developer identity.

The system 80 shows the registrar 82 using a computer system 42 and accompanying catalog instance user interface to define a developer entity, as indicated by the developer entity transaction information 84. The registrar 82 can optionally be authenticated before this process.

The user interface of the registrar system 42 includes UI controls and options allowing the registrar 82 to supply information 86-90 about the developer identity, such as the identifying name 86 and a security mechanism (e.g., the public key 88 and digital signature 90).

Note that the registrar 82 can be a person, business entity, automated process, etc. When a person is the registrar 82, a user interface for implementing developer entity registrations is accessible via the registrar system 42 (which may be a desktop personal computer, laptop, tablet, smartphone, or other device)

In different embodiments, the user interface and accompanying registrar system 42 can be processed in whole or in part by remotely located processors such as servers, a cloud service, etc., coupled over a network. In cases where the registrar's functions are performed automatically, a process can perform the functions using any suitable processing hardware and software. In general, unless otherwise specified, functionality described herein can be performed by any combination of hardware and software, located in different geographical areas, and at different points in time.

The information 86-90 comprising the developer entity transaction 84 is transferred by a request to the first catalog instance 32 for implementation of the developer entity registration process 94 (also called the catalog process in the present example embodiment).

As shown within the catalog process 84, steps 98-108 include verifying the signature 90 using the supplied public key 88; checking for existing developer entity (in case the same entity is already defined), and optionally having a community lead perform verification (e.g., manually signing paperwork). Failure at any of these steps aborts the process. Otherwise the transaction 84 is formatted and submitted for incorporation into the unverified queue 38.

The catalog process 94 can be executing remotely from the subject registrar 82, developer entity, or other actors. For example, the functionality of catalog process 94 and other catalog processes can be performed on a server computer, cloud service, personal computer system at a peer location, etc.

Additional catalog instances 110, 112 illustrate the existence of peers of the first catalog instance 32. The transaction 84 formatted in step 102 is propagated to them 110, 112, in an unverified state. Eventually, when sufficient unverified transactions exist within the queue 38, the transactions will be verified and committed to the ledger (as a block of the blockchain 20) by one of these catalog instances 32, 110, 112. The verified transaction i.e. definition of a developer entity in this case will then be available to all catalog instances 32, 110, 112 via the distributed blockchain 20 to which they all have read access permissions. Once the transaction has been committed, all catalog instances 32, 110, 112 will prevent the creation of duplicate developer entity registrations, i.e., transactions. In some embodiments, catalog instances 32, 110, 112 may prevent duplication even when the initial transaction is in an unverified state.

Once a developer entity has been registered and verified on the ecosystem 80, it will have also been propagated to all full-nodes 32, 110, 112. Thereafter one or more namespaces may be allocated to that developer entity. The namespace registration process can be similar to the initial developer entity registration process, in that it can be initiated by any individual in possession of the developer entity secret.

The peer-to-peer propagation and verification of catalog entries and instances can be similar to the shared ledger approach used in virtual currency implementations (e.g., Bitcoin, Dogecoin, etc.). However, in contrast with the virtual currency systems, the generation of a block need not be made compute intensive since the contemplated software component ecosystem 80 comprises known entities that can be authenticated, if desired (e.g., by the example identity domain 44 of FIG. 2). Thus, there is no need for a time-consuming computational requirement (sometimes referred to as "mining" in virtual currency applications).

Figure 5:
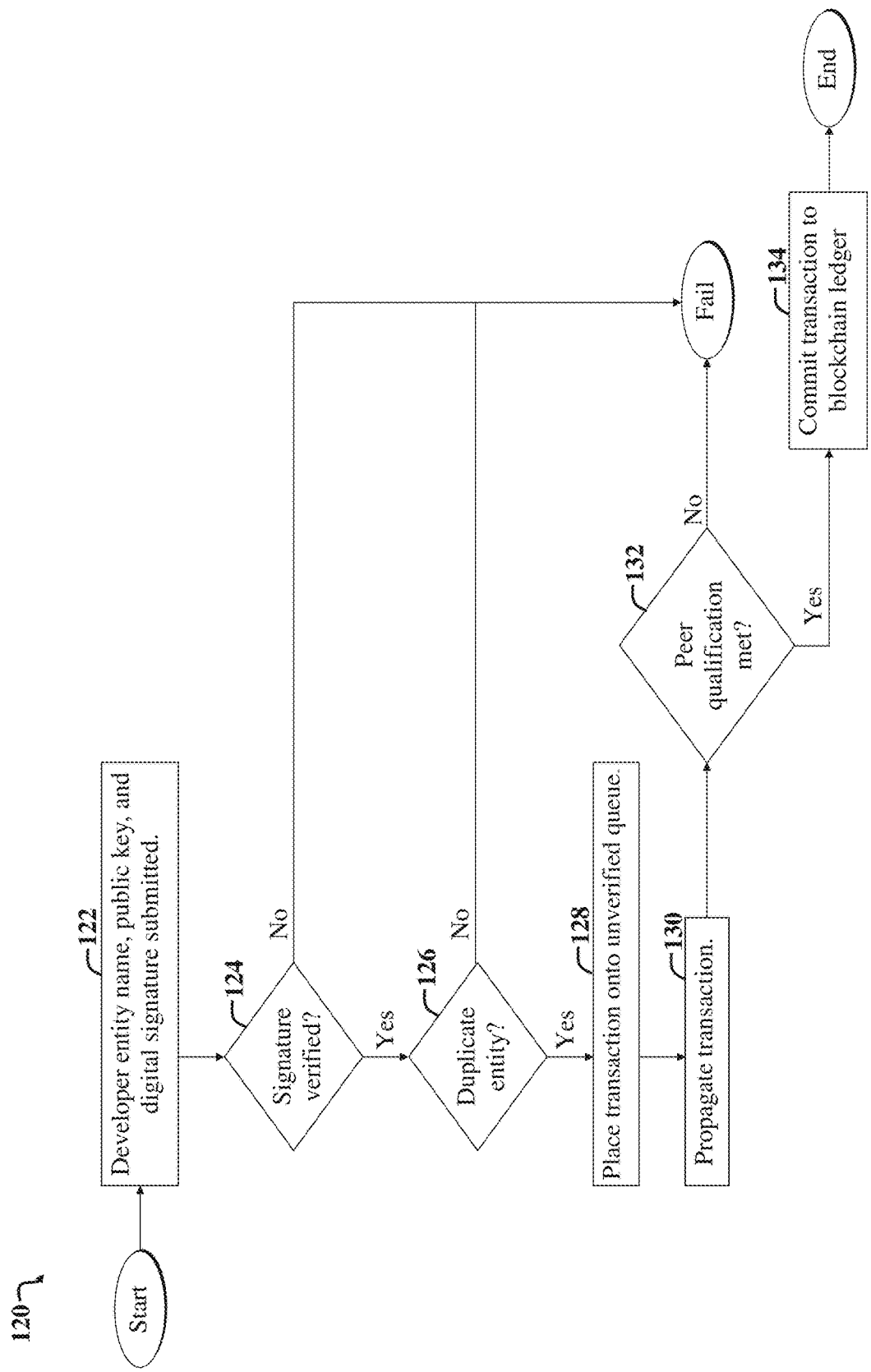
FIG. 5 is a flow diagram of a first example method implementable via the second example ecosystem of FIG. 4.

FIG. 5 is a flow diagram of a first example method 120 implementable via the second example system and accompanying ecosystem 80 of FIG. 4, and also implementable via the related ecosystems of FIGS. 1-3.

The first example method 120 includes an additional information-submittal step 122, which includes submittal, e.g., via the registrar 82 of FIG. 4, developer entity name, public key, and digital signature to a catalog instance (e.g., the catalog instance 32 of FIG. 4).

Next, the submitted information (e.g., corresponding to the developer entity registration transaction information 84 of FIG. 4) is verified at a verification step 124, and checked if the information represents a duplicate entry in a blockchain and/or unverified queue. If both of these checks 124, 126 pass, then the associated developer entity registration transaction is placed onto an unverified queue at step 128 and propagated to other catalog instances at step 130; otherwise, the transaction registration process aborts.

After propagation of the transaction to other catalog instances, i.e., nodes, the nodes may collectively determine whether a peer qualification is met for the catalog instance (e.g., catalog instance 32 of FIG. 4) that is propagating the transaction to the other catalog instances. If the catalog instance performing the registration does not meet the predetermined peer qualification (which may vary depending upon the needs of a given implementation), then the registration process fails. Otherwise, a catalog instance from among available catalog instances is selected, at step 134, to perform computations (e.g., computation of hashes) required to commit the transaction to the distributed blockchain ledger (e.g., the blockchain 20 of FIG. 4).

The algorithm or method used to select a given catalog instance for performing computations to transfer groups of one or more transactions from a verified queue to the distributed blockchain (e.g., blockchain 20 of FIG. 4) is implementation specific and may vary, depending upon the needs of a given implementation. For example, in certain embodiments, the first available catalog instance (or instance with the most available computing resources) is selected as the catalog instance to perform the computation; in other implementations, the catalog instance may take a majority vote of catalog instances to determine which catalog instance should perform the computation; in yet other implementations, catalog instances may take turns committing blocks (via a round robin approach), and so on.

In summary, FIG. 5 represents a flowchart of a method 120 that may be implemented by the system 80 of FIG. 4. Step 122 is executed to receive a developer entity name, public key, and digital signature that are collectively being proposed as a new transaction to be committed to the distributed blockchain ledger 20 of FIG. 4.

At step 124, a check is made a check is made to verify the digital signature. If verification fails then the process terminates with a failure condition, and the transaction is not committed to the ledger. Otherwise, if the signature passes verification then execution proceeds to step 126 where a check is made for a duplicate entity (e.g., name previously used). If the check 126 fails, then the process 120 aborts as before. Otherwise, step 128 is executed to place the transaction on the queue. Next, at step 130, the transaction is made available to other peer processes on the network, i.e., that are part of the peer-to-peer component ecosystem.

Steps 132 and 134 verify the block containing the transaction according to the rules of the underlying ledger; then commit and share the transaction information across all catalog instances by way of the distributed blockchain ledger (e.g., blockchain 20 of FIG. 4) to which the transaction has been committed.

Figure 6:
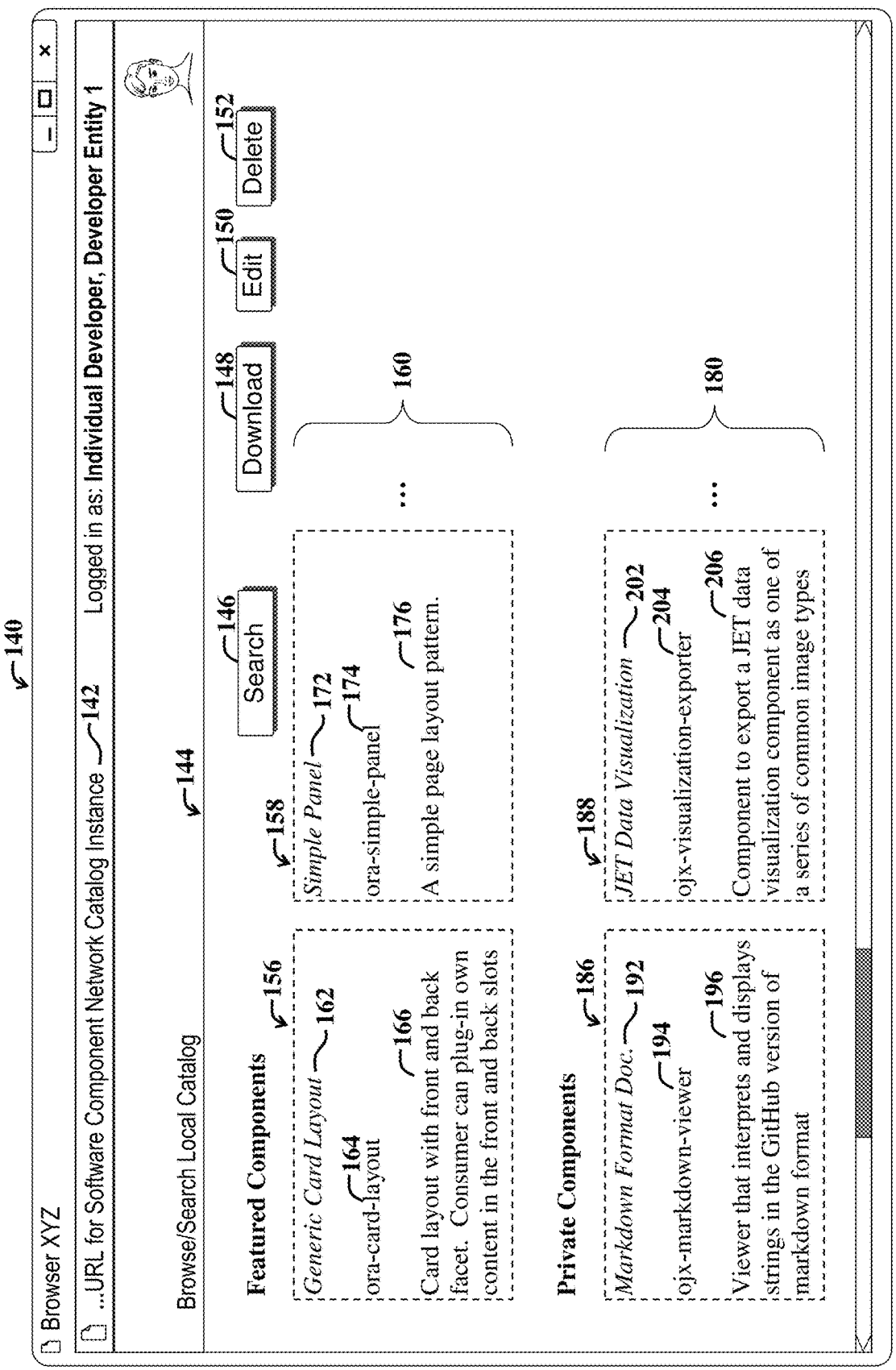

FIG. 6 shows an example UI display screen 140 that may be displayed on a computing system, such as the user developer computing system 62 of FIG. 3 via the UI display screen 70. The example UI display screen 140 includes various UI controls and options 144-180 for browsing a catalog of software components, searching (e.g., via a search button 146), downloading (e.g., via a download button 148), editing (e.g., via an edit button 150), and deleting (e.g., via a delete button 152) software components 156, 158, 186, 188 from the catalog entries/options 144, which are maintained by a catalog instance (e.g., the catalog instance 32 of FIG. 3) to which accompanying computing system has access.

In the present example embodiment, a software component in the catalog 144 is indicated by one or more corresponding component cards 156, 158, 186, 188, which are divided into featured components 160 and private components 180.

Each of the software components include component names 162, 172, 192, 202, corresponding filenames 164, 174, 194, 204, and descriptions 166, 176, 196, 206. A given component UI card 156, 158, 186, 188 may be selected by a user. Right-clicking a card may reveal additional user options, e.g., to drill down into more information about a given component and to access additional user options and controls for interacting with, e.g., downloading the component. Note that, as opposed to right-clicking a card, or other UI affordances, such as selection of a "details button", etc., could also be used, without departing from the scope of the present teachings.

In summary, the example UI display screen 140 represents an example portion of a catalog UI. The UI display screen 140 shows various example UI cards or thumbnails 156, 158, 186, 188 that include information about a software component.

Note that each component card 156, 158, 186, 188 may show additional information, e.g., may include graphical information or images (e.g., images of a UI display screen that the component generates), author information, namespace designation, more detailed descriptions of the components, status (e.g., support status or position in a development cycle) of a given component, the number of times a component has been downloaded, whether or not the component is a demo, and so on. In other embodiments, different ways to represent the components can be used, along with providing other types of information.

For the example component UI card 156, the name is shown as "ora-card-layout". The first part of the name in this example scheme, "ora," is referred to as the base "namespace" from which additional text can be appended to form the complete and unique component name.

Note that a namespace for a component may also be recorded elsewhere in the component metadata in some systems, as well as or instead of the component name prefix approach illustrated in FIG. 6. Nevertheless, in both approaches, a namespace and component name, which are ultimately unique for each component in the associated ecosystem, are shown in a given UI display screen showing available software components of a local software component catalog. The ecosystem may, in some embodiments, allocate a synthetic identity e.g. a 128 bit Universal Unique IDentifier (UUID) in addition to the namespace and component name, so as to define a unique identity for any given component.

Each Developer entity is assigned a base namespace that can be one or more terms onto which can be appended additional descriptors or names, as the developer chooses. The name "ojx" (e.g., corresponding to the file name 194 of the component UI card 186) is another example of a base namespace designator in the components shown in FIG. 6. Note that in the example of FIG. 6, the base namespaces are just 3 characters, but other embodiments can use any number and type of designations.

Note that the various component UI cards 156, 158, 186, 188 may show additional information pertaining to blockchain registration information associated with each identified component. For example information that has been verified and committed to a blockchain ledger, e.g., component name, namespace, owner, status, and license information that the component is supplied under can also be viewed.

In the present example embodiment, the catalog UI will only display UI cards for software components for download that are verified, such as by having a checksum matching the checksum of a corresponding registration for that component in the accompanying blockchain transaction.

Note that if a user performs an operation, e.g., downloads a component, the download process may also involve completion of a download registration process for that component. Furthermore, note that additional UI controls and options other than those shown in the example UI display screen 140 are possible. For example, additional options for uploading components, initiating various types of blockchain registration transactions, and so on, may be provided.

Figure 7:
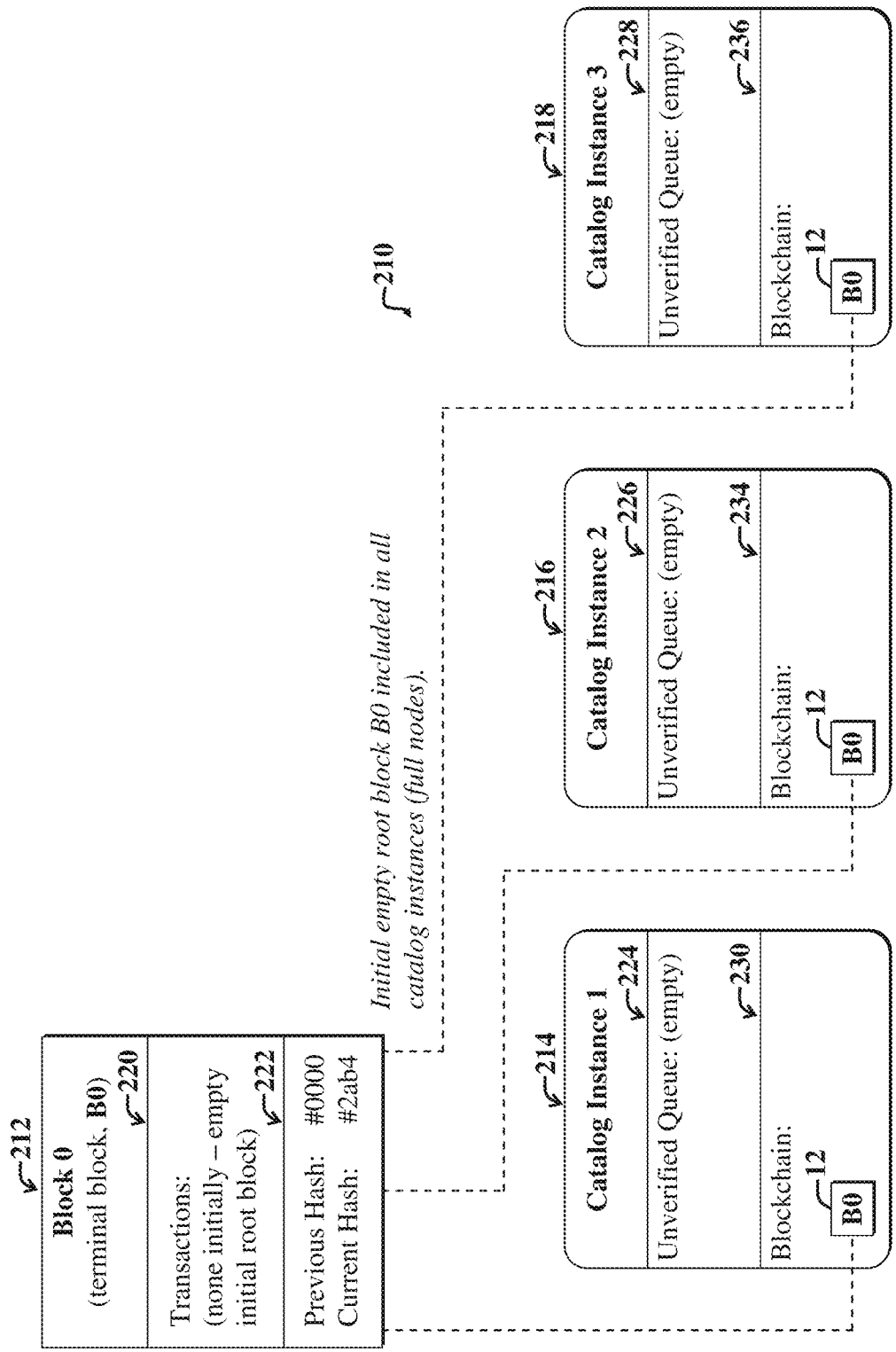
FIG. 7 is a first block diagram illustrating a third example ecosystem and accompanying computing environment illustrating an initial state of a blockchain maintained by nodes, called catalog instances, of a peer-to-peer software component ecosystem.

FIG. 7 is a first block diagram illustrating a third example system 210 (representing a software component ecosystem) illustrating an initial state of a blockchain 212, 230 maintained by intercommunicating nodes 214-218, called catalog instances, of a peer-to-peer software component ecosystem represented by the third example system 210. FIG. 7 illustrates an example initial state of the system 210, which includes a blockchain (manifesting as distributed replicas 230-236 of blocks 212 of the blockchain) with an empty root block 212 (block 0).

In the present example embodiment, the three catalog instances 214-218 represent software running on different computer systems and/or virtual machines, wherein the computer systems and/or virtual machines intercommunicate via a network. The catalog instances 214-218 may be implemented via one or more clouds, e.g., collections of one or more intercommunicating servers.

Each of the catalog instances 214-218 are shown in an initial state, with unverified queues 224-226. For the purposes of the present discussion, an unverified queue may be any data storage mechanism for storing computing objects, e.g., computing objects corresponding to one or more transactions, before the computing objects are processed and included in the blockchain 230-236. Note that the blockchain 230-236 includes individual replicas of a blockchain, which is shared or replicated among the catalog instances 214-218.

The sharing of contents 212 of the catalog instances 230-226 may be effectuated by software implemented by each catalog instance 214-218, wherein the software includes computer code for enabling communications between catalog instances 214-218, including replication of blockchain contents 212 among respective blockchains 230-236. Note that the blockchain 230-236 currently only includes the initial root block (also called initial terminal block, block 0, or the zeroth block) 212. The initial terminal block 212 may be initially devoid of transactions, which may otherwise be stored in a payload section 220 of the block 212.

Note that transaction payloads, transaction hashes, transaction public keys, block hashes, block payloads, and so on, illustrated herein and discussed more fully below, are merely illustrative and may vary, without departing from the scope of the present teachings. Furthermore, only a small example subset of possible transactions are illustrated and discussed herein and more fully below. Those skilled in the art with access to the present teachings may readily implement and use embodiments discussed herein to collect, verify, and store in a blockchain for selective access by various ecosystem nodes, to meet the needs of a given implementation, and without undue experimentation.

The initial terminal block 212 includes a hash section 222 with a field for a hash of a previous block (called the previous hash), which in the present use case is zero. The hash section 222 further includes a current hash (also called the starting hash for the blockchain), which, for illustrative purposes is denoted #2ab4. Note that the "#" in the hash symbol "#2ab4" may represent a wildcard character or placeholder for a longer hash value, which may be a SHA-256 (Secure Hash Algorithm-256) or other type of hash. The exact type of hash used may be implementation specific and may vary, without departing from the scope of the present teachings.

Figure 8:
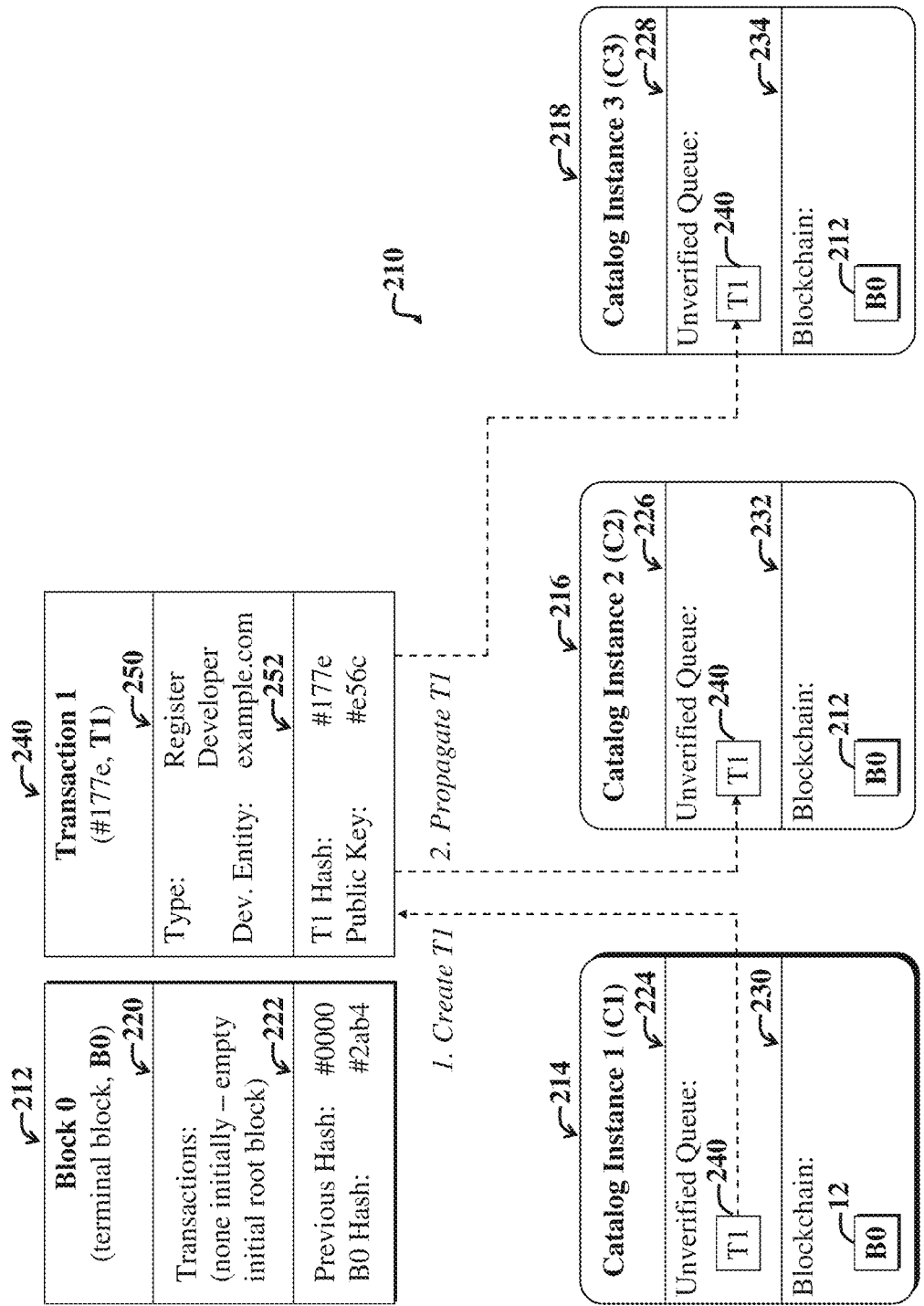
FIG. 8 is a second block diagram illustrating the third example system of FIG. 7 after a first example transaction (i.e., a developer registration transaction) has been propagated to unverified queues of the catalog instances via an originating catalog instance (e.g., a first catalog instance).

FIG. 8 is a second block diagram illustrating the third example system 210 of FIG. 7 after a first example transaction (i.e., a developer registration transaction) 240 has been propagated to unverified queues 224-226 of the catalog instances 214-218 via an originating catalog instance (e.g., a first catalog instance), which in the present example use case is a first catalog instance 214.

Note that a given catalog instance 214-218 may communicate with developer computers (called developer systems) of a developer entity (or other entity) that has been authenticated (e.g., via Public Key Infrastructure (PKI)) for access to a given catalog instance 214-218. The catalog instances 214-218 may run software to facilitate generating UI display screens for enabling developers, contributors, and/or consumers of software components to upload and/or download software components to and/or from a particular catalog instance 214-218 for which they have been authenticated, and in accordance with privileges associated with credentials supplied during initial authentication and registration with the catalog instances 214-218.

Note that a given developer (and/or contributor, consumer, etc.) entity, e.g., a corporation may use a registrar entity to interface particular developer users and associated computer systems with one or more of the catalog instances 214-218. A developer and associated computer system that communicates with a catalog instance 214-218, e.g., to download and/or upload transactions; to initiate various types of registrations, and so on, may act as a proxy for the developer entity to which the developer belongs.

As shown in FIG. 8, in the present example use case, the first catalog instance 214 has received a first transaction 240 to be registered in the blockchain 230-234. The first catalog instance 214 includes computer code for facilitating creating and storing the first transaction 240 in a first unverified queue 224, and then propagating copies or replicas of the first transaction 240 to other unverified queues 226-226 of the ecosystem nodes 214-218.

The first example transaction 240 includes a first transaction payload section 250, which includes type information (e.g., specifying "Register Developer" transaction type) and developer entity information (e.g., "example.com). Note that the data stored in the transaction payload section 250 of the first transaction 240 is merely illustrative and may vary, without departing from the scope of the present teachings.

Furthermore, one or more data items from other sections of the transaction 240, e.g., a hash section 252, may be included in the payload section 250, and/or vice versa, without departing from the scope of the present teachings. The hash section 252 of the first example transaction 240 includes a first transaction hash (e.g., #177e) and a public key (e.g., #e56c) associated with the developer entity registrant of the first transaction 240.

After creation of the first developer registration transaction 240, the first catalog instance 214 includes peer-to-peer ecosystem software and blockchain interfacing software to propagate the first transaction 240 for initial storage in the unverified queues 226, 226 of the other catalog instances 216, 218. Note that the other nodes 216, 218 may not necessarily receive the first transaction 240 simultaneously, depending upon network latency, etc.

Figure 9:
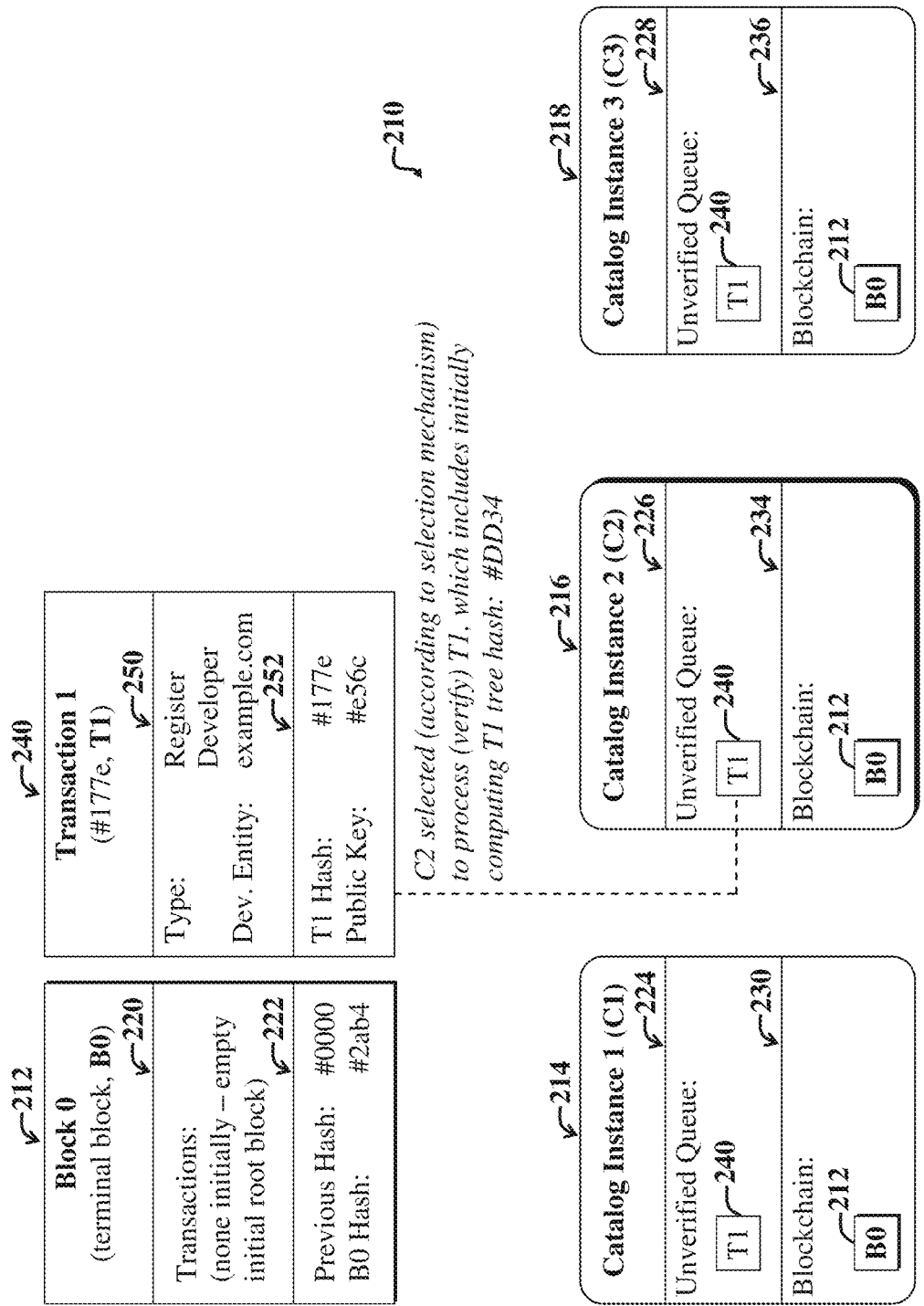
FIG. 9 is a third block diagram illustrating the third example system of FIG. 8 during processing of, i.e., verification of the initial developer registration transaction and committal to the blockchain, by a catalog instance (e.g., a second catalog instance) that has been selected (in accordance with a selection rule or algorithm) to process, e.g., verify or validate, the developer registration transaction.

FIG. 9 is a third block diagram illustrating the third example system 210 of FIG. 8 during processing of, i.e., verification of the initial developer registration transaction 240 and committal to the blockchain 230-236, by a catalog instance (e.g., a second catalog instance 216) that has been selected (in accordance with a selection rule or algorithm) to process, e.g., verify or validate, the developer registration transaction 240.

Note that the selection rule or algorithm used to determine which catalog instance 214-218 shall be responsible for processing and verifying the transaction 240 for incorporation into a block of the blockchain 230-236 may be implementation specific and may vary depending upon the needs of a given implementation. For example, in certain embodiments, the first available catalog instance 214-218 is selected for processing; in other embodiments, a single catalog instance 214-218 is dedicated for processing of all transactions for incorporation into blockchain blocks; in other embodiments, all catalog instances 214-218 process transactions simultaneously, and the catalog instance 214-218 that is first to complete the processing commits the resulting verified block to the blockchain 230-236; in other embodiments, processing and effort required to complete the processing of the blocks may be allocated in accordance with a trustworthiness score or metric associated with each catalog instance 214-218; in other embodiments, a consensus or voting mechanism to enable the catalog instances 214-218 to determine which catalog instance 214-218 should process a given set of one or more transactions is employed, and so on.

During processing (called transaction verification or validation herein) of the first developer registration transaction 240, the selected catalog instance 216 initially computes a tree hash for the block in which the first transaction 240 is to be incorporated. The tree hash (e.g., Merkle tree) includes a hash of all pending transactions (which in this case includes only the first developer registration transaction 240). The resulting tree hash (e.g., #DD34) is incorporated in the block created for the first developer registration transaction 240, as discussed more fully below.

In summary, based on pluggable verification functionality implemented by the catalog instances, one or more nodes (catalog instances 214-218) are assigned to roll up any outstanding transactions in preparation for committal of the transaction(s) to a new block in the blockchain 230-236.

The decisions about how many nodes are involved may vary from implementation to implementation. In a simple implementation, where the nodes are all trusted, a single node may be responsible for transaction validation. In other implementations, multiple nodes may carry out the verification in a simultaneous manner and the results compared to achieve consensus. The transaction validation process and block creation may vary based on details of the underlying blockchain implementation. In the present example embodiment, difficulty levels for calculating a hash value (e.g., the T1 hash #DD34) need not be selectively varied. However, note that block hash-computation difficulty levels (and/or other proof-of-work difficulty levels) may be scaled according to the overall level of trust within the particular ecosystem, and/or in accordance with levels of trust associated with individual catalog instances 214-218 assigned to perform transaction validation, which involves committal of the transaction 240 to the shared blockchain 230-236.

Figure 10:
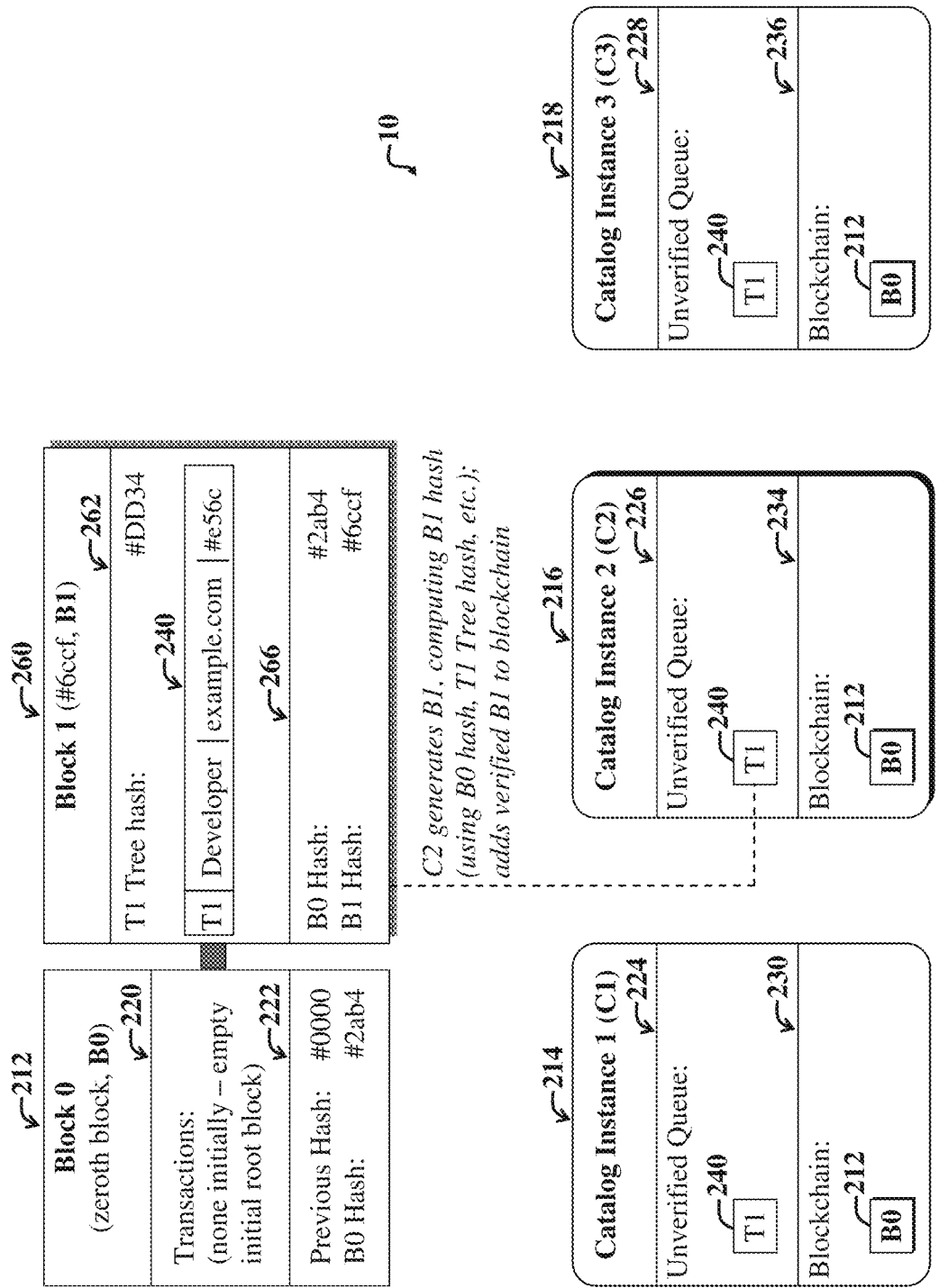
FIG. 10 is a fourth block diagram illustrating the third example system of FIG. 9 during computation of a block of the blockchain by the selected catalog instance, wherein the block includes pending transactions in the unverified queues, including the developer registration transaction of FIG. 9.

FIG. 10 is a fourth block diagram illustrating the third example system 210 of FIG. 9 during computation of (also called verification of or validation of) a block 260 for the blockchain 230-236 by the selected catalog instance 216, wherein the block 260 includes any pending transaction(s) (which in this case includes only one transaction 240, also called T1) in the unverified queues 224-226, including the developer registration transaction 240 of FIG. 9.

The second catalog instance 216 completes validation of the block 260 (after computation of the T1 tree hash #DD34), which includes creating a first block hash (#6ccf) for the first block 260. The first block hash (#6ccf), also called the Block 1 (B1) hash is computed by selectively hashing and/or otherwise combining or incorporating the previous block hash (B0 hash #2ab4) with the T1 tree hash #DD34 and other information (as may or may not be needed to meet the needs of a given implementation), e.g., information stored in the first developer registration transaction (T1) 240. The resulting B1 hash is included in the first block (B1) 260 along with the hash (B0 hash) of the immediately prior block 212.

Note that the first block (B1) 260 includes a transaction section 262 that includes the first transaction 240 or a hashed or encoded version thereof. For illustrative purposes, a hash section 266 is shown including a hash for the B1 block (B1 hash) #6ccf and a hash for the previous block (B0 hash) #2ab4.

The transaction section 262 may be encoded using the T1 tree hash #DD34. In the present example embodiment, the B1 block includes or incorporates at least three hashes, including the T1 tree hash #DD34, the B1 hash #6ccff, and the B0 hash #2ab4, and the public key #e56c for the first transaction (T1) 240. The T1 transaction 240 in the B1 block 260 may also incorporate and/or store the T1 transaction hash #177e (used to compute the T1 tree hash #DD34), as shown in FIG. 9.

The public key #e56c may also represent a hash. Furthermore, note that in certain implementations, the B1 hash #6ccf may be used to encode or hash the B1 block 260, and/or may be simply included in a computing object or record representative of the B1 block 260.

After computation of the various hashes 266, including the T1 tree hash #DD34 (which may be used to encode the T1 transaction 240), the B1 block has been verified and is ready for propagation, by the second catalog instance (C2) 216 to other catalog instances 214, 218 of the ecosystem 210.

In summary, the second catalog instance 216 creates a new block 260 that records the T1 tree hash #DD34 and associated transactions. The newly validated block 260 becomes the terminal block of the blockchain 230-236, as shown in FIG. 11.

Figure 11:
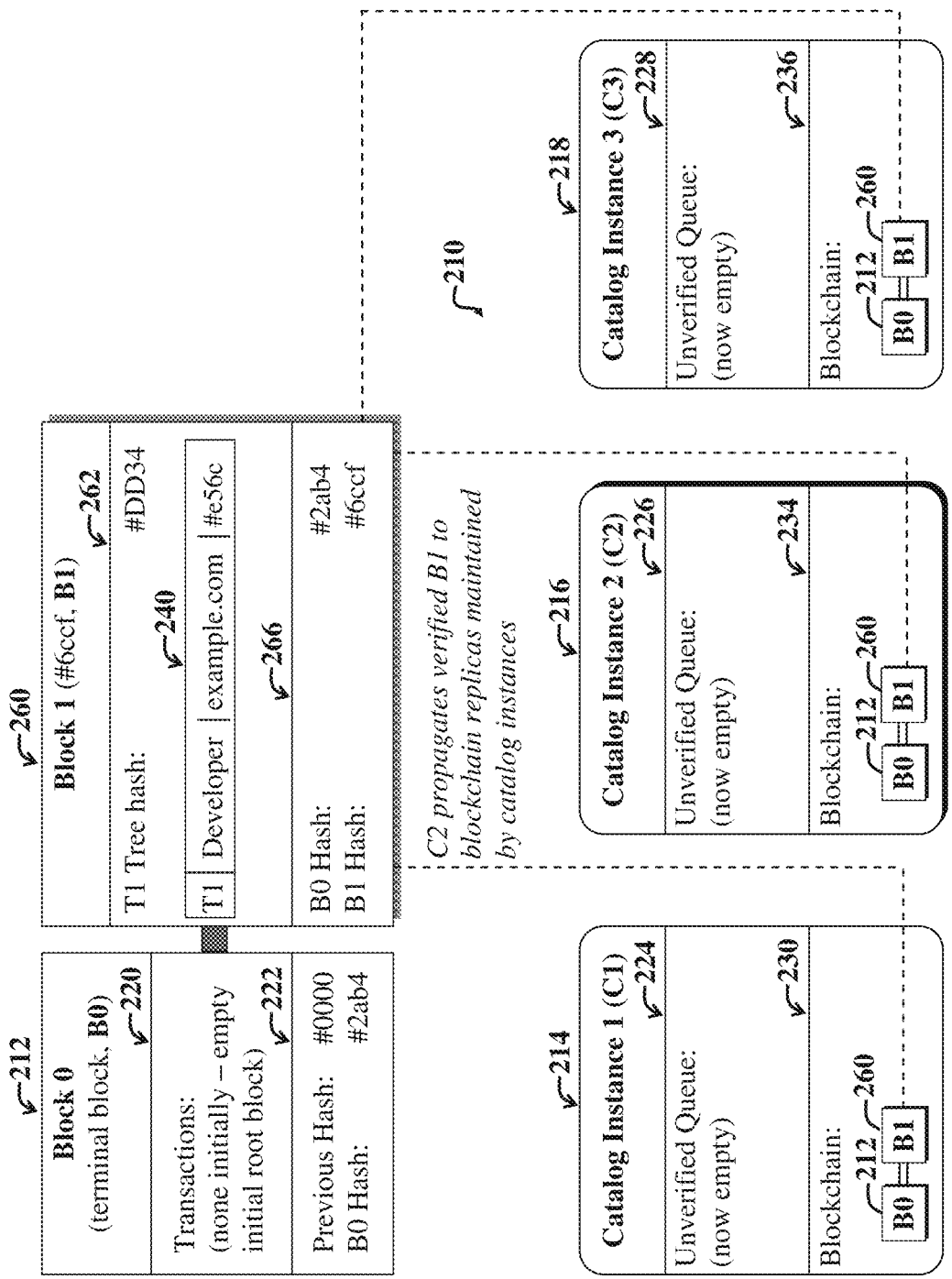
FIG. 11 is a fifth block diagram illustrating the example system of FIG. 10 after the block processed by the second catalog instance has been committed to the blockchain and propagated to blockchain replicas maintained by each of the catalog instances of the ecosystem.

FIG. 11 is a fifth block diagram illustrating the example system of FIG. 10 after the block 260 processed by the second catalog instance 216 has been committed to the blockchain 230-236 and propagated to blockchain replicas maintained by each of the catalog instances 214-218 of the ecosystem 210. Note that since the T1 transaction 240 has now been verified and committed to a block 260 that has been propagated to the other catalog instances 214-218, it is removed from the unverified queue (i.e., replicas thereof) 224-226.

Figure 12:
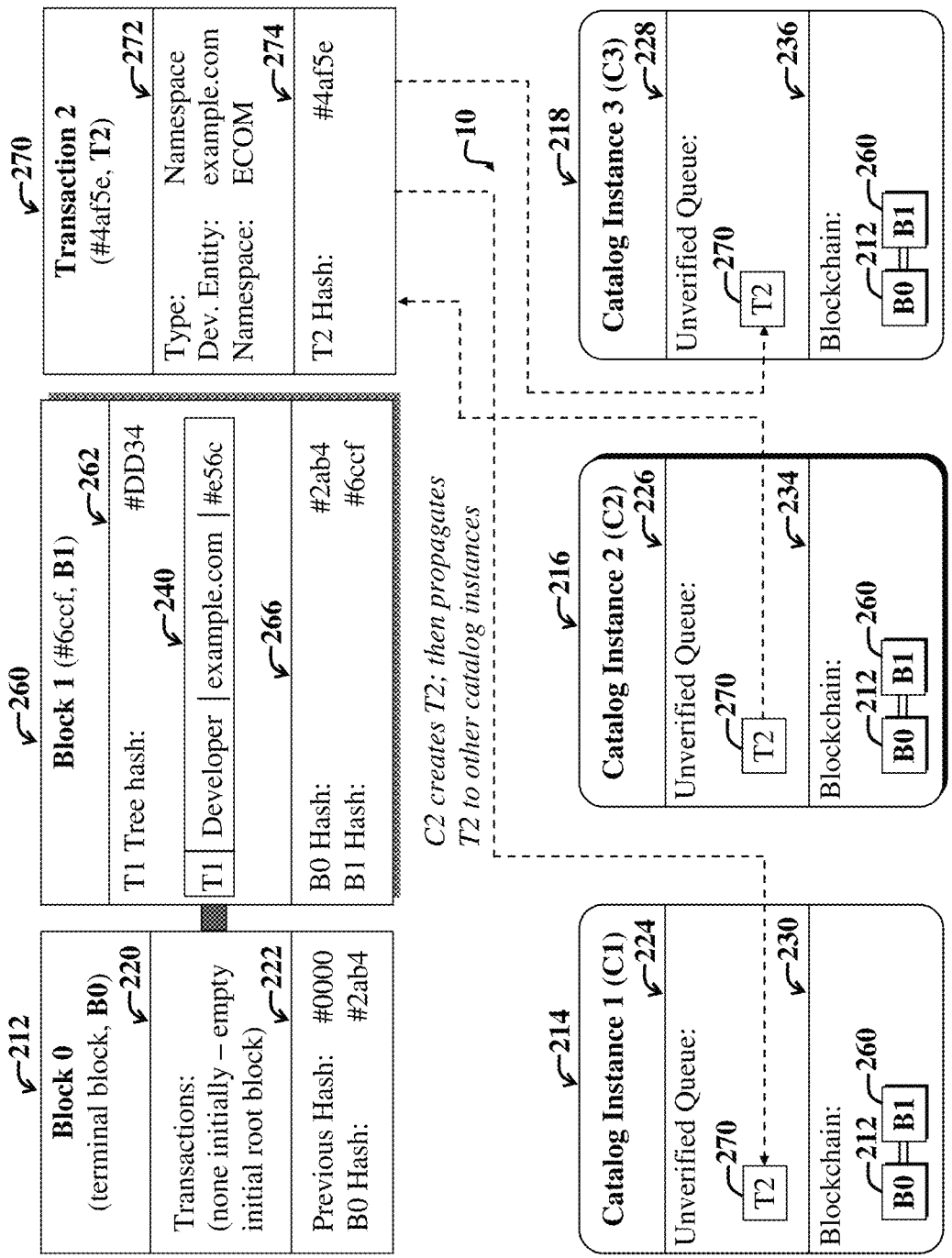
FIG. 12 is a sixth block diagram illustrating the example system of FIG. 11 after a second catalog instance has initiated a second transaction (i.e., a first namespace registration transaction) and has propagated the second transaction to unverified queues of other catalog instances in the software component ecosystem.

FIG. 12 is a sixth block diagram illustrating the example system 210 of FIG. 11 after the second catalog instance has initiated a second transaction (i.e., a first namespace registration transaction T2) 270 and has propagated the second transaction (T2) 270 to unverified queues 224-226 of other catalog instances 214-218 in the software component ecosystem 210.

The second example transaction (T2) 270 includes an example transaction payload section 272, which includes transaction type information (e.g., indicating that the present transaction 270 is a namespace transaction), developer entity name (e.g., example.com) associated with the T2 transaction 270, and namespace information (e.g., a name that may be used for a collection of one or more additional names and/or terms) associated with the developer entity (example.com) tied to the namespace registration associated with the T2 transaction 270. For illustrative purposes, the T2 transaction is shown including a hash section 274 with a transaction hash (T2 hash #4af5e) for the T2 transaction 270.

In the present example use case of FIG. 12, the second catalog instance 216 facilitates creation of the T2 transaction 270 and subsequent propagation to the unverified queues 224-226 of the other catalog instances 214, 218.

In summary, a namespace transaction (T2) 270 is submitted (e.g., by a registrar of the developer entity example.com) to register a new namespace (e.g., ECOM) for the developer entity. The second catalog instance 216 creates the T2 transaction 270, which represents a namespace registration transaction by the developer entity for a namespace called ECOM. This T2 transaction 270 is broadcast across the ecosystem 210 so all other nodes 214-218 receive a copy of it. It is not yet enshrined in any block of the blockchain 230-236, and accordingly, its status is pending in FIG. 12. Note that not all nodes 214, 218 will receive the transaction simultaneously, as receipt timing may depend upon network latency or other factors.

Note that while any of the catalog instances 214-218 may collect, process, and propagate transactions, e.g., the T2 transactions (as they all have the verified developer entity on file, e.g., as stored in the B1 block 260 of the blockchain 230-236), for illustrative purposes, the present example use case involves transaction creation by the second catalog instance 216.

Note that in some implementations, registration of a namespace against a developer is selectively restricted until the original developer registration is several blocks deep in the blockchain 230-236, where the depth may vary depending upon the implementation and levels of trust associated with the catalog instances 214-218 and/or other nodes with read/write access to the blockchain 230-236. This can help to ensure that the developer registration is definite and could not be rolled back by a difference of option if a consensus mechanism we being used, e.g., in ecosystems employing untrusted or not fully trusted catalog instances.

Figure 13:
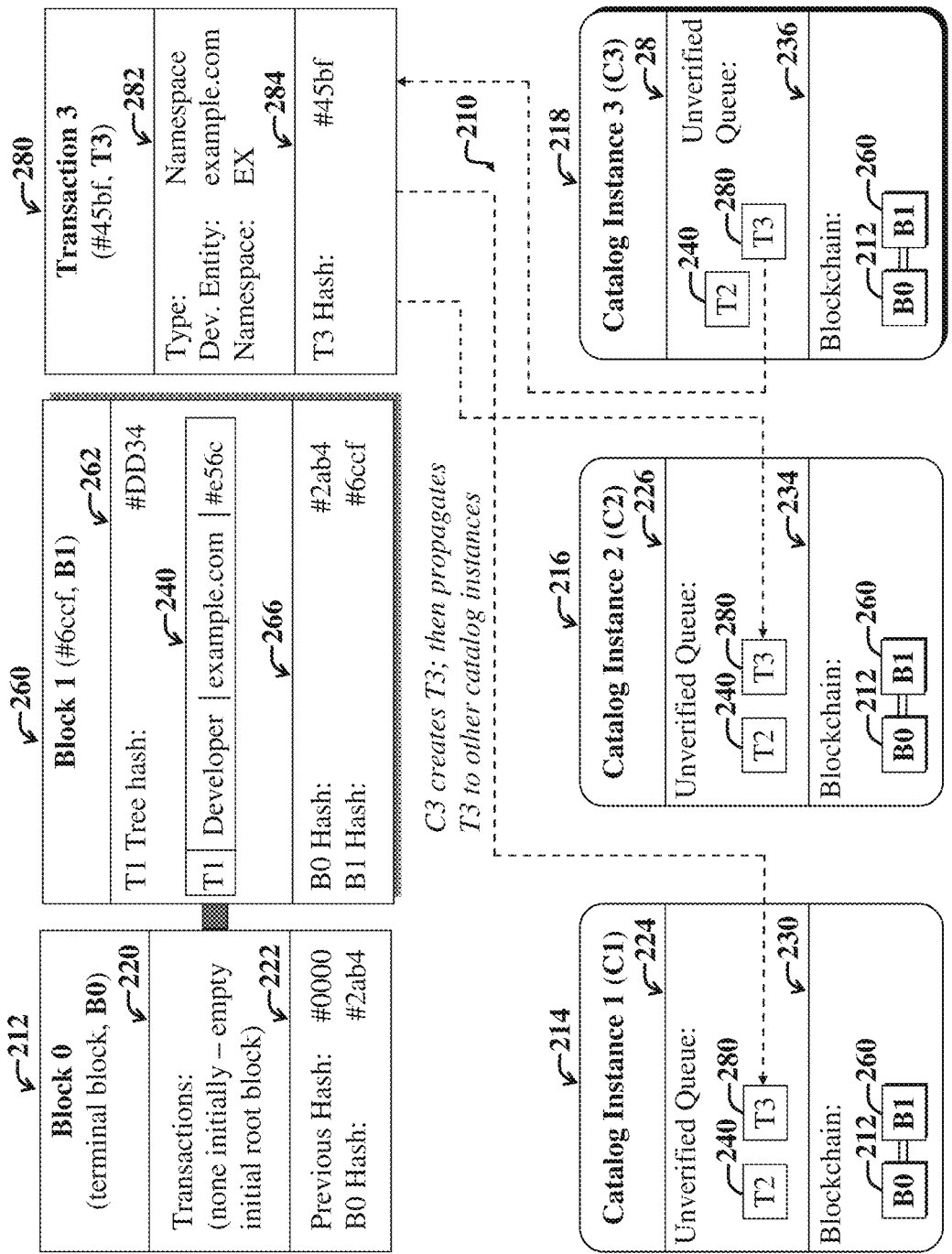
FIG. 13 is a seventh block diagram illustrating the example system of FIG. 12 after a third catalog instance has initiated a third transaction (i.e., a second namespace registration transaction), which has been propagated to the unverified queues of other catalog instances in the software component ecosystem.

FIG. 13 is a seventh block diagram illustrating the example system 210 of FIG. 12 after a third catalog instance 218 has initiated a third transaction (i.e., a second namespace registration transaction T3) 280, which has been propagated the unverified queues 224-226 of other catalog instances 214, 216 in the software component ecosystem.

The T3 transaction 280 also includes a transaction payload section 282 and a hash section 284, which includes a hash (T3 hash #45bf) for the T3 transaction. Note that while a separate hash section 284 is shown in the various transactions 270, 280 of FIGS. 12 and 13, that the transaction hashes (#4af5e, #45bf) may be used to encode the respective transactions 270, 280.

In summary, creation and propagation of the T3 transaction by the third catalog instance 218 is performed similarly to the creation and propagation of the T2 transaction, with the exception that the third catalog instance 218 is submitting the T3 transaction 280 to the unverified queues 224-226 in preparation for committal of the T3 transaction to the blockchain 230-236.

Figure 14:
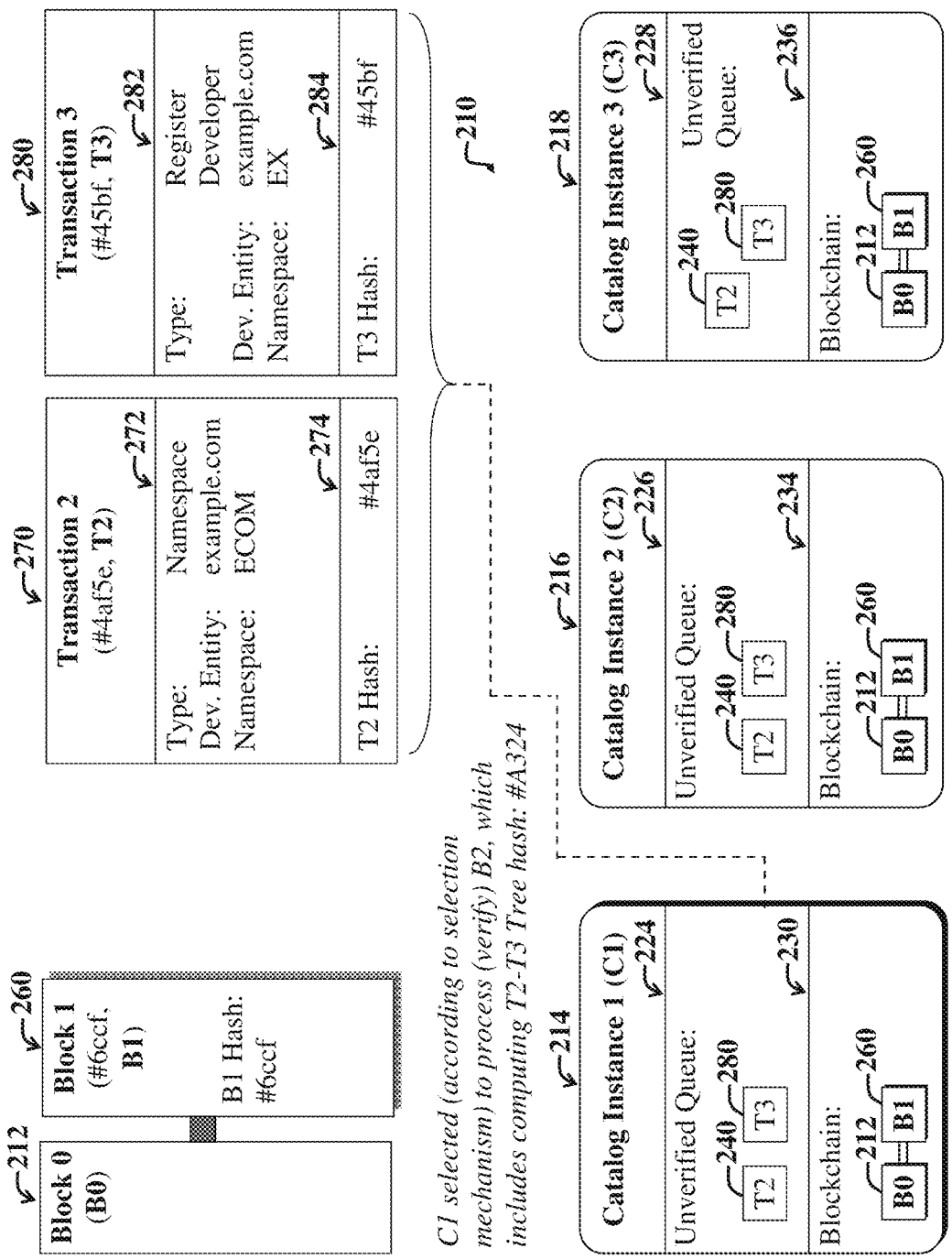
FIG. 14 is an eighth block diagram illustrating the example system of FIG. 13 after the first catalog instance has been selected to verify an additional block for inclusion in the blockchain, wherein the additional block is to incorporate the second transaction and the third transaction of FIGS. 12 and 13, respectively.
Figure 15:
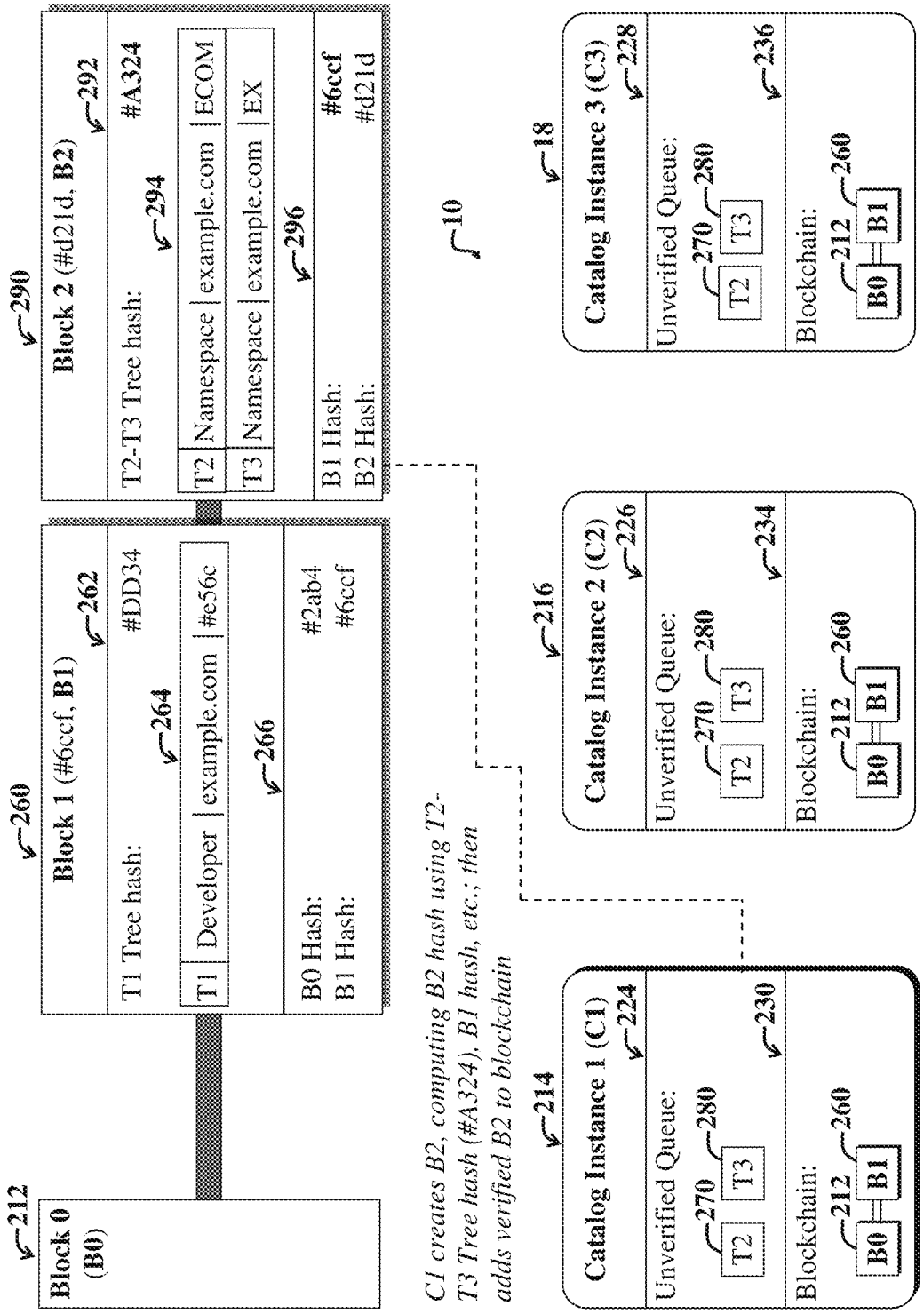
FIG. 15 is a ninth block diagram illustrating the example system of FIG. 14 showing the first catalog instance during computation of the additional block to be added to the blockchain of the software component ecosystem.

FIG. 14 is an eighth block diagram illustrating the example system 210 of FIG. 13 after the first catalog instance 214 has been selected to verify an additional block (B2, as shown in FIG. 15 below) for inclusion in the blockchain 230-236, wherein the additional block is to incorporate the second transaction (T2) 270 and the third transaction (T3) 280 of FIGS. 12 and 13, respectively. Note that the selection of a particular catalog instance (e.g., the first catalog instance 214) to perform validation for a given block, may be in accordance with a predetermined selection mechanism, e.g., rule and/or algorithm. The exact rule or algorithm is implementation specific and may vary, depending upon the needs of a given implementation.

The first catalog instance 214 begins computations in preparation for incorporation of the pending transactions 240, 280 by calculating a tree hash using the different transaction hashes 274, 284 (e.g., #4af5e and #45bf, respectively). Exact details as to how the hashes are calculated are implementation specific and may vary. Those skilled in the art with access to the present teachings may readily select and implement a particular hashing algorithm to meet the needs of a given implementation, without undue experimentation.

FIG. 15 is a ninth block diagram illustrating the example system 210 of FIG. 14 showing the first catalog instance 214 during computation of an additional block (B2) 290 to be added to the blockchain 230-236 of the software component ecosystem 210. The B2 block 290 includes a transaction section 292, which includes or otherwise incorporates the combined tree hash (combining the T2 and T3 transaction hashes, and denoted T2-T3 tree hash #A324) and the T2 and T3 transactions 294. A hash section 296 includes the previous block hash (B1 hash #6ccf) and the current block hash (B2 hash #d21d).

Hence, the first catalog instance 214 creates the new block 290 (i.e., performs block verification), which incorporates the tree hash of T2 (70 of FIG. 14) and T3 (80 of FIG. 14). The B1 hash #6ccf represents the previous hash, i.e., the hash of block 260. The B2 hash is calculated based on the combined tree hash #A324, the B1 hash #6ccf, and optionally, additional information, e.g., control information and/or information from the transaction section 292. Upon construction of the block 290 and completion of calculations for the various accompanying hashes, the B2 block is propagated to the blockchain 230-236 for incorporation as a new block B2, as shown in FIG. 16.

Figure 16:
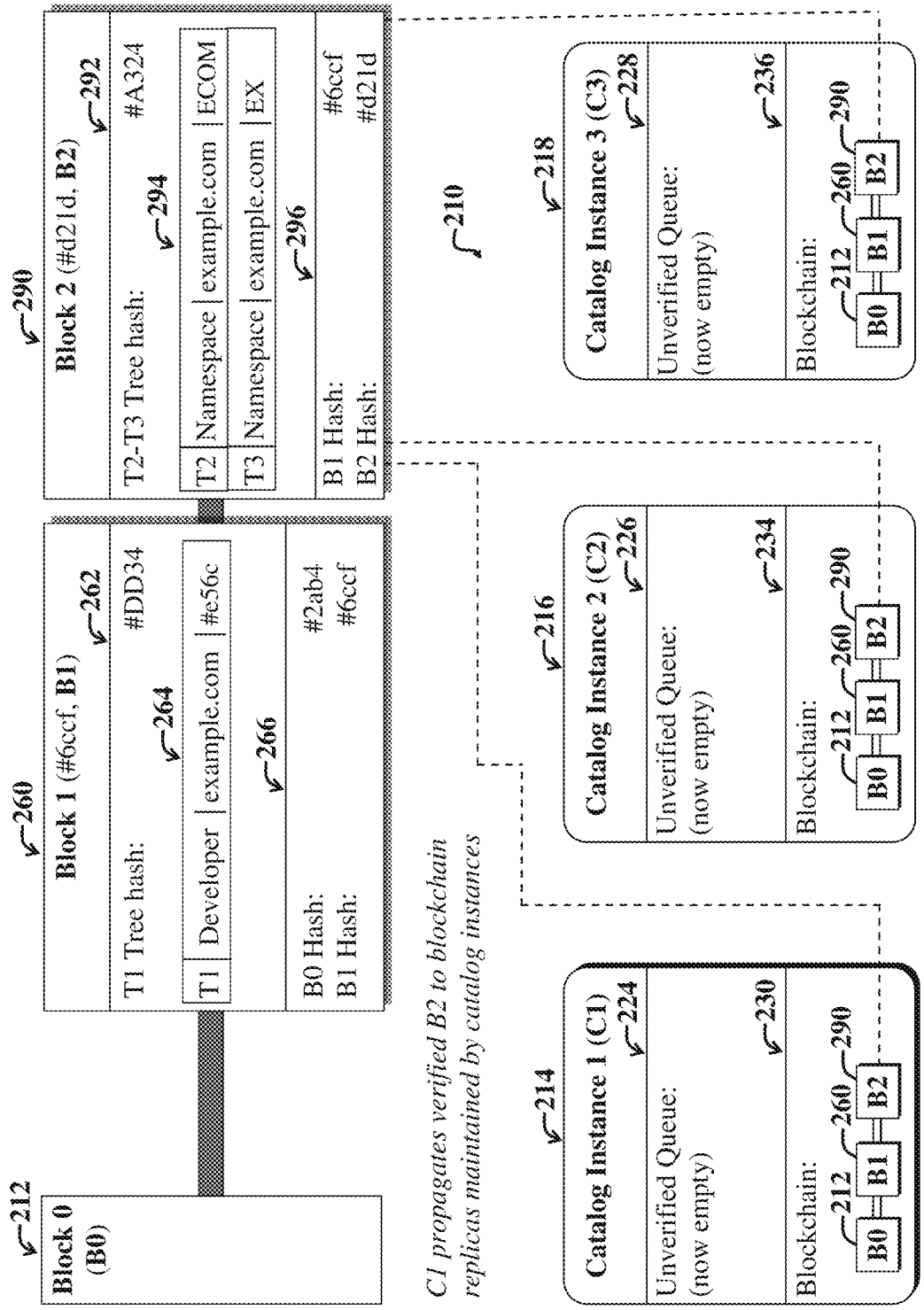
FIG. 16 is a tenth block diagram illustrating the example system of FIG. 15 after the first catalog instance has completed processing of the additional block and has propagated the additional block to the blockchain of the software component ecosystem.

FIG. 16 is a tenth block diagram illustrating the example system 210 of FIG. 15 after the first catalog instance 214 has completed processing of the additional block and has propagated the additional block 290 to the blockchain 230-236 of the software component ecosystem 210. The associated T2 (70 of FIG. 14) and T3 (80 of FIG. 14) transactions 294 are removed from the unverified queues 224-226 after they have been committed to the B2 block 290.

Note that further transactions of various types, including software component registrations, component usage registrations, and any other transaction types may proceed in a similar fashion as discussed above for the three transactions T1, T2, T3. Zero or more transactions may be selectively processed from the pending transaction queue (also called the unverified queue 224-226) into a validated block, which is then added onto the chain 230-236.

If a new catalog instance or other node with read/write access to the blockchain 230-236 is created and added to the ecosystem 210, the new node can process the blockchain 230-236 to reconstruct an accurate view of the system 210 based on registrations in the blockchain 230-236. In some implementations the system 210 may selectively extract information from the blockchain 230-236 and store it in a different form for convenience or to improve performance. The blockchain 230-236 may represent a source of truth and information describing a key state of the ecosystem 210, which can be reconstructed from the information in the blockchain 230-236.

Conventionally, computing ecosystems are generally limited to: 1. Centralized control (e.g., Apple's App Store), or 2. So-called Wild West (e.g., Windows Mobile method of users browsing the web for independent developer offerings).

Note that use of one or more blockchain features, as opposed to other types of data records or databases, can be substantially unnecessary (for certain implementations within the scope of some embodiments discussed below) in an already trusted computing environment, i.e., an ecosystem wherein some or all of the network nodes and resources are already controlled and trusted. Such an ecosystem can be unlikely to need consensus based evaluation of transactions, and hence, competitions, chainings, and hashing can be less important than the distributed storage of time-stamped registrations, which could be implemented via another type of distributed database other than blockchain.

Accordingly, various embodiments (comprising aspects of the proposed ecosystem) do not necessarily all require use of a blockchain distributed ledger. Blockchain implementations can represent specific embodiments—particularly in implementations involving untrusted environments.

In other words, a "blockchain" using a mechanism called "proof of work" need not be required in some trusted environments. Note that in certain embodiments discussed above with reference to FIGS. 7-16, the "work to compute blocks" can be implemented via computation of hashes.

Figure 17:
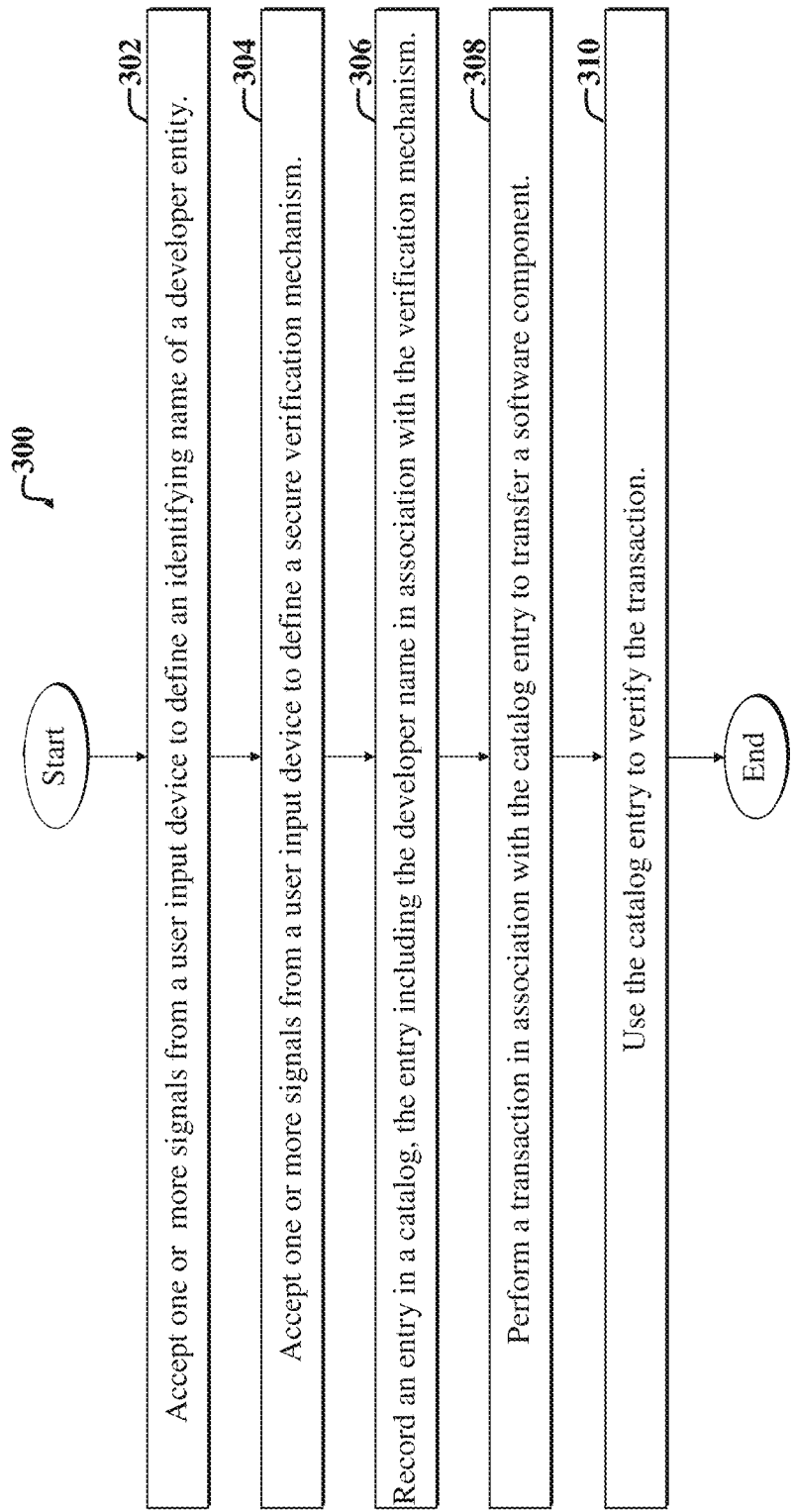
FIG. 17 is a flow diagram of a second example method implementable via the embodiments of FIGS. 1-16.

FIG. 17 is a flow diagram of a second example method 300 implementable via the embodiments of FIGS. 1-16. The example method 300 facilitates implementing a software component ecosystem, e.g., an ecosystem constructed in accordance with the embodiments of FIGS. 1-3.

The second example method 300 includes a first step 302, which involves accepting one or more signals from a user input device to define an identifying name of a developer entity. For example, with reference to FIG. 4, this may involve the registrar system 42 accepting input from the registrar 82 pertaining to the developer entity transaction 84, i.e., the developer entity name 86.

A second step 304 includes accepting one or more signals from a user input device to define a secure verification mechanism (usable to verify that the developer entity is authorized to register the identifying name). For example, with reference to FIG. 4, the security mechanism may include a public key 88 and digital signature 90, e.g., for use by an identity domain (e.g., the identity domain 44 of FIG. 2) and/or a security and permissions module (e.g., the module 62 of FIG. 3) of the catalog instance 32, which may implement public key infrastructure for handling the public key 88 and digital signature 90 for developer entity verifications.

A third step includes recording an entry in a distributed database implemented by a catalog (e.g., the first catalog instance 32 of FIG. 4). The initial recording may involve verifying the developer entity transaction data before recording a corresponding entry in a distributed unverified queue 38 of the distributed database implementing a distributed ledger (e.g., the distributed ledger 14 of FIG. 3), which also includes a blockchain 20. Once a recorded entry is committed to the blockchain 20, it is said to be registered with the distributed ledger 14 and accompanying blockchain 20 of FIG. 3. The initially recorded the entry includes the developer name in association with the verification mechanism.

A fourth step 308 includes performing a transaction in association with the catalog (i.e., distributed database or ledger implemented via a running instance of catalog software) entry to transfer a software component. This transaction may also be registered in the distributed ledger (e.g., the distributed ledger 14 and accompanying distributed blockchain 20) as a software component download registration transaction by a registered contributor (e.g., individual developer), who has registered with the ledger as a contributor in association with a registered developer entity and one or more associated namespaces.

A fifth step 310 includes using the catalog entry, i.e., an entry (corresponding to a developer entity registration transaction) in blockchain (e.g., blockchain 20 of FIG. 3) of the distributed ledger (e.g., distributed ledger 14 of FIG. 3) of a catalog instance to verify, i.e., complete the registration of and committal of (to the blockchain 20 of the distributed ledger 14 of FIG. 3) another transaction describing the software component download transaction.

Note that for the purposes of the present discussion, a catalog may be set of code for implementing a distributed ledger, e.g., a blockchain. Catalogs may or may not include a local database of available software components, as such database can be implemented separately from the catalog, without departing from the scope of the present teachings. Nevertheless, in various embodiments discussed herein a given catalog instance also includes computer code for interacting with and maintaining a local database of available components (e.g., the local component catalog sore 36 of FIG. 3). The terms "catalog" and "catalog instance" may be employed interchangeably herein.

Note that the method 300 may be altered, without departing from the scope of the present teachings. For example, additional steps may be added; some steps may be interchanged; steps may be removed or replaced; and additional modifications or further details may be added to and/or removed from the various steps 320-310 of the method 300.

For example, the second example method 300 may further specify that the secure verification mechanism includes a public key and a digital signature. The method 300 may further specify a step of propagating the catalog entry to multiple nodes, e.g., catalog instances, in the software component ecosystem.

The second example method 300 may further specify that each of the multiple nodes represents a catalog instance that includes code for implementing a distributed blockchain ledger in concert with the other multiple nodes, which maintain replicas or approximate replicas of the distributed blockchain ledger.

The second example method 300 may further specify a process for allocating a namespace to the entry, e.g., registering a namespace registration transaction with an associated distributed blockchain 20.

The second example method 300 may further specify and/or be replaced with the following steps: using an instance of a component catalog of a distributed peer-to-peer component ecosystem that includes plural intercommunicating catalog instances, to perform the following: accepting developer registration entity information pertaining to a developer entity name; verifying and committing developer entity information to a distributed database implemented as a blockchain, wherein the blockchain is accessible to each of the plural intercommunicating catalog instances, as a developer entity registration record or block, thereby propagating the developer entity registration information to all full nodes of the peer-to-peer component ecosystem.

The second example method 300 may further specify that the step of accepting developer registration entity information occurs after a step of: supplying, by a developer entity, the developer entity name, public key associated with a catalog instance for which registration is being performed, and a digital signature (using developer entity secret, i.e., private key) associated with the developer entity name and usable to confirm developer entity identity, with a catalog instance of the plural intercommunicating catalog instances The full nodes of the peer-to-peer component ecosystems may include the plural intercommunicating catalog instances. The second example method 300 may further specify allocating one or more namespaces to a developer entity after propagating the developer entity registration information, and in response to initiation and implementation of a namespace registration process by: associating one or more supplied namespaces during a namespace registration process with the developer registration information.

The second example method 300 may further include selectively delaying implementation of the namespace registration process for a developer entity until after several records or blocks are committed to a chain of records of the blockchain.

Figure 18:
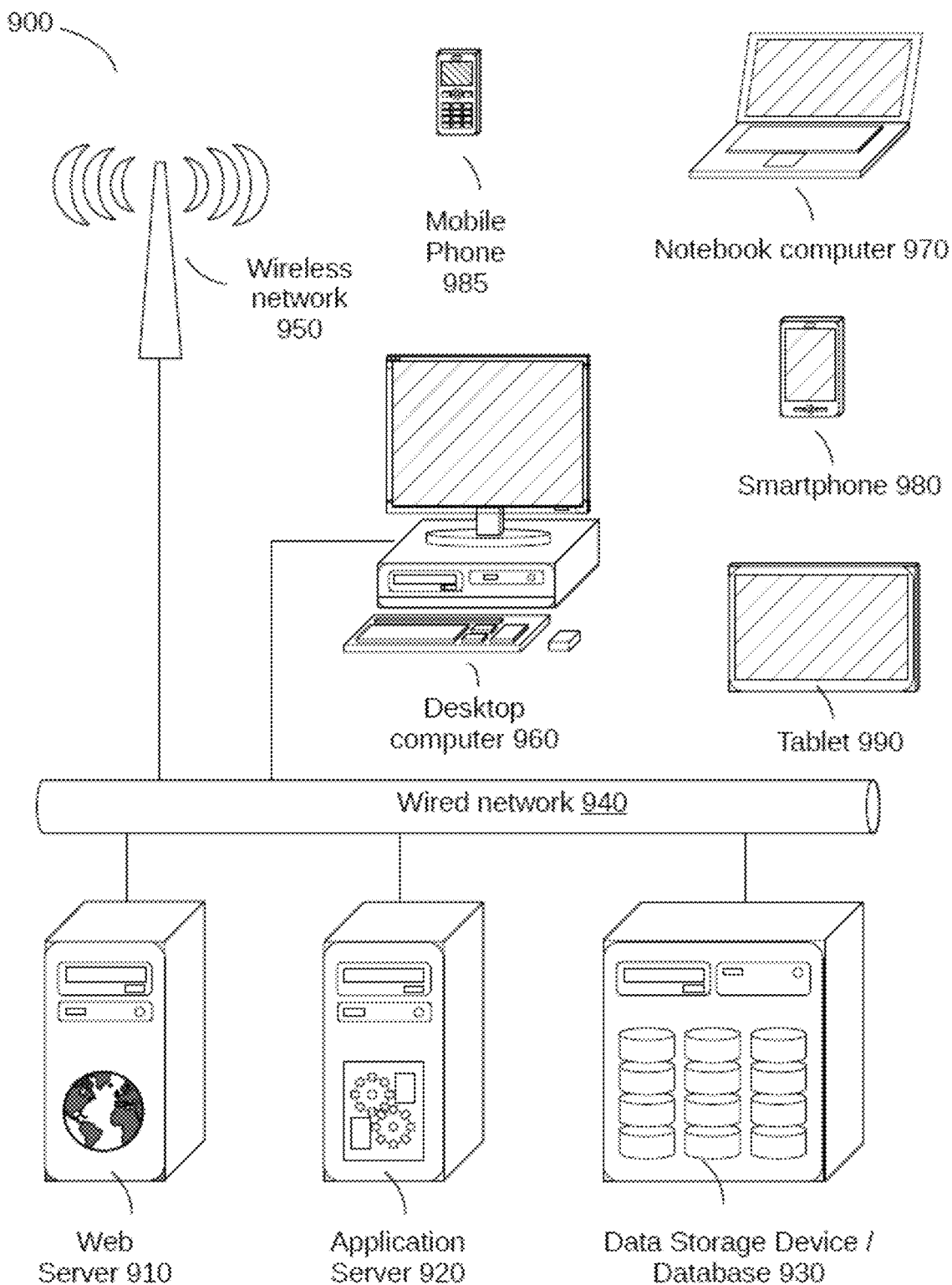
FIG. 18 is a general block diagram of a system and accompanying computing environment usable to implement the embodiments of FIGS. 1-17.

FIG. 18 is a general block diagram of a system 900 and accompanying computing environment usable to implement the embodiments of FIGS. 1-17. The example system 900 is capable of implementing a distributed software component ecosystem according to embodiments of the invention. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

As an example, with reference to FIGS. 2 and 18, the web server 910, application server 920, and data storage device/database 930 may be used to implement the distributed ledger 14 of FIG. 2 by hosting server-side applications corresponding to the catalog instance 32, which is in turn accessible to individual computer systems via a browser. Alternatively, or in addition, the individual computing devices 950, 985, 970, 980, 990 may run catalog instance software that is networked into a peer-to-peer component ecosystem using the wired network 940 and/or wireless network 950.

Figure 19:
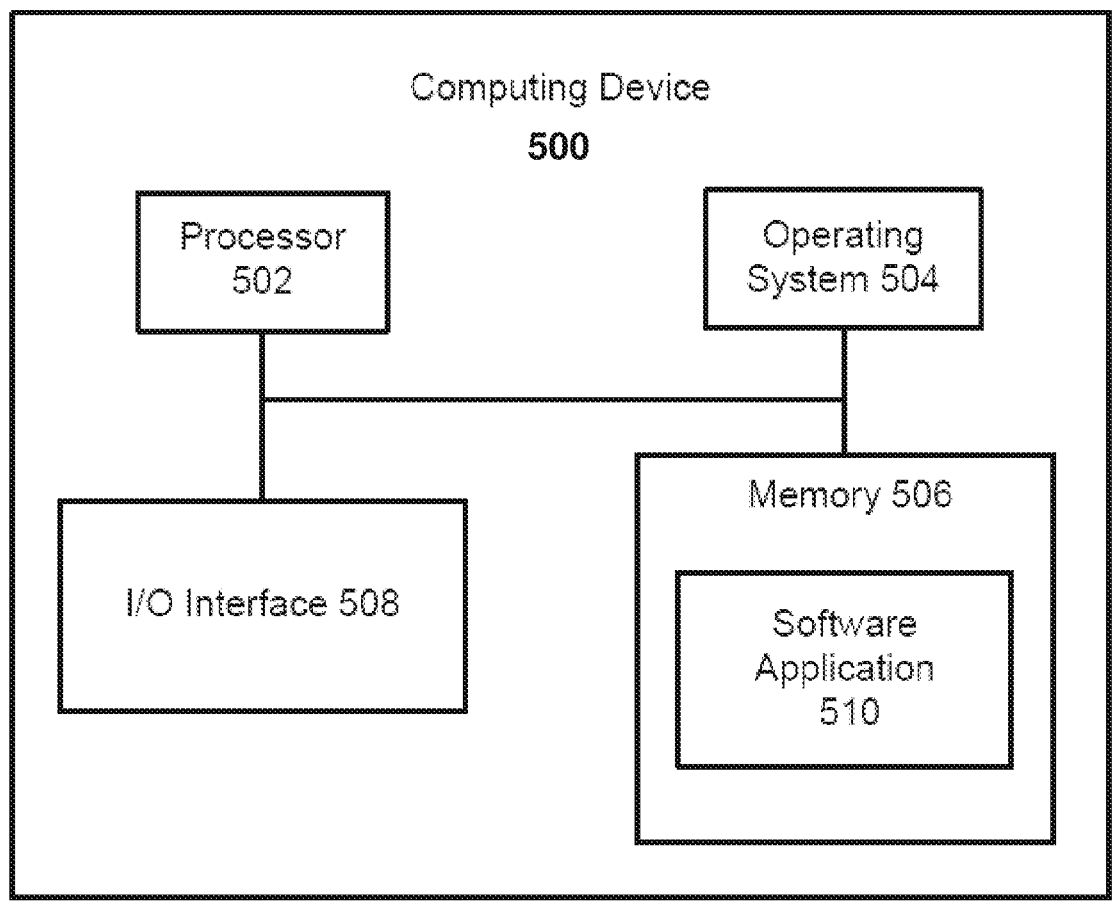
FIG. 19 is a general block diagram of a computing device usable to implement the embodiments of FIGS. 1-18.

FIG. 19 is a general block diagram of a computing device usable to implement the embodiments of FIGS. 1-18. While system 500 of FIG. 19 is described as facilitating performing the steps as described in certain implementations herein, any suitable component or combination of components of system 500 or any suitable processor or processors associated with system 500 may be used for performing the steps described.

FIG. 19 illustrates a block diagram of an example computing system 500, which may be used for implementations described herein. For example, computing system 500 may be used to implement server devices 910, 920 of FIG. 18 as well as to perform the method implementations described herein. In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 19 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

As an example, with reference to FIGS. 3 and 19, the computing device 500 of FIG. 19 may be used to implement the individual developer system 62 of FIG. 3.

Although the description has been described with respect to particular embodiments thereof, these particular embodiments are merely illustrative, and not restrictive.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. One or more non-transitory tangible storage media including logic for execution by one or more processors and when executed, cause the one or more processors to perform operations for verifying a blockchain in a networked computing ecosystem, the operations comprising:
    designating two or more select catalog instances, to intercommunicate and perform transaction validation, wherein the two or more select catalog instances satisfy one or more selection rules including a level of trust;
    receiving into an unverified queue of the two or more select catalog instances, a developer registration transaction including identifying information of a developer of a software component for the blockchain, wherein the developer registration transaction is propagated by an originating catalog instance to respective unverified queues of the catalog instances of the networked computing ecosystem, wherein the respective unverified queues contain one or more unverified transactions that are pending for committal to the blockchain;
    validating the developer registration transaction in the unverified queues of the two or more select catalog instances;
    comparing results of the two or more select catalog instances validating the developer registration transaction;
    achieving a consensus of the results to verify that the developer is authorized to register the identifying information;
    generating a new hash by selectively incorporating a previous block hash and a hash for the developer registration transaction;
    committing the new hash to a new block of the blockchain; and
    in response to committing the new hash removing the developer registration transaction from the unverified queues.

2. The one or more non-transitory tangible storage media of claim 1, wherein the developer registration transaction includes a developer name, a public key of the developer, and a digital signature of the developer.

3. The one or more non-transitory tangible storage media of claim 1, wherein the operations further comprise: in response to validating the developer registration transaction, checking for any existing developer registrations of a same developer entity name in at least one of the blockchain or the unverified queues, wherein committing the new hash to the new block of the blockchain is in response to confirming there are no existing developer registrations.

4. The one or more non-transitory tangible storage media of claim 1, wherein generating the new hash includes a difficulty level for calculating the new hash that is scaled according to the level of trust of the two or more select catalog instances.

5. The one or more non-transitory tangible storage media of claim 1, wherein generating the new hash includes a difficulty level for calculating the new hash that is scaled according to a level of trust of the networked computing ecosystem.

6. The one or more non-transitory tangible storage media of claim 1, further comprising: incorporating the developer registration transaction and an additional transaction into the new block of the blockchain.

7. The one or more non-transitory tangible storage media of claim 6, wherein the additional transaction includes documentation of one or more events, occurrences, properties, or relationships characterizing the networked computing ecosystem.

8. A method for verifying a blockchain in a networked computing ecosystem, the method comprising:
designating two or more select catalog instances, to intercommunicate and perform transaction validation, wherein the two or more select catalog instances satisfy one or more selection rules including a level of trust;
receiving into an unverified queue of the two or more select catalog instances, a developer registration transaction including identifying information of a developer of a software component for the blockchain, wherein the developer registration transaction is propagated by an originating catalog instance to unverified queues of the catalog instances of the networked computing ecosystem, wherein the respective unverified queues contain one or more unverified transactions that are pending for committal to the blockchain;
validating the developer registration transaction in the unverified queues of the two or more select catalog instances;
comparing results of the two or more select catalog instances validating the developer registration transaction;
achieving a consensus of the results to verify that the developer is authorized to register the identifying information;
generating a new hash by selectively incorporating a previous block hash and a hash for the developer registration transaction;
committing the new hash to a new block of the blockchain; and
in response to committing the new hash removing the developer registration transaction from the unverified queues.

9. The method of claim 8, wherein the developer registration transaction includes a developer name, a public key of the developer, and a digital signature of the developer.

10. The method of claim 8, further comprising: in response to validating the developer registration transaction, checking for any existing developer registrations of a same developer entity name in at least one of the blockchain or the unverified queues, wherein committing the new hash to the new block of the blockchain is in response to confirming there are no existing developer registrations.

11. The method of claim 8, wherein generating the new hash includes a difficulty level for calculating the new hash that is scaled according to the level of trust of the two or more select catalog instances.

12. The method of claim 8, wherein generating the new hash includes a difficulty level for calculating the new hash that is scaled according to a level of trust of the networked computing ecosystem.

13. An apparatus for verifying a blockchain in a networked computing ecosystem, the apparatus comprising:
one or more processors;
logic encoded in one or more tangible media for execution by the one or more processors and when executed, is operable to perform operations comprising:
designating two or more select catalog instances, to intercommunicate and perform transaction validation, wherein the two or more select catalog instances satisfy one or more selection rules including a level of trust;
receiving into an unverified queue of the at least one select catalog instance, a developer registration transaction including identifying information of a developer of a software component for the blockchain, wherein the developer registration transaction is propagated by an originating catalog instance to unverified queues of the catalog instances of the networked computing ecosystem, wherein the respective unverified queues contain one or more unverified transactions that are pending for committal to the blockchain;
validating the developer registration transaction in the unverified queues of the two or more select catalog instances;
comparing results of the two or more select catalog instances validating the developer registration transaction;
achieving a consensus of the results to verify that the developer is authorized to register the identifying information;
generating a new hash by selectively incorporating a previous block hash and a hash for the developer registration transaction;
committing the new hash to a new block of the blockchain; and
in response to committing the new hash removing the developer registration transaction from the unverified queues.

14. The apparatus of claim 13, wherein the developer registration transaction includes a developer name, a public key of the developer, and a digital signature of the developer.

15. The apparatus of claim 13, wherein the logic when executed are further operable to perform operations comprising: in response to validating the developer registration transaction, checking for any existing developer registrations of a same developer entity name in at least one of the blockchain or the unverified queues, wherein committing the new hash to the new block of the blockchain is in response to confirming there are no existing developer registrations.

16. The apparatus of claim 13, wherein generating the new hash includes a difficulty level for calculating the new hash that is scaled according to the level of trust of the two or more select catalog instances.

17. The apparatus of claim 13, wherein generating the new hash includes a difficulty level for calculating the new hash that is scaled according to a level of trust of the networked computing ecosystem.

\* \* \* \* \*